(12) United States Patent
Rouaix

(10) Patent No.: US 8,175,925 B1
(45) Date of Patent: May 8, 2012

(54) POSITION-BASED ITEM IDENTIFICATION IN A MATERIALS HANDLING FACILITY

(75) Inventor: François M. Rouaix, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 413 days.

(21) Appl. No.: 11/506,432

(22) Filed: Aug. 18, 2006

(51) Int. Cl.
*G06G 1/14* (2006.01)
*G06Q 30/00* (2012.01)

(52) U.S. Cl. .......................................... 705/22; 705/26.9

(58) Field of Classification Search ................. 235/383, 235/385; 700/232; 705/14, 22, 28
See application file for complete search history.

(56) References Cited

U.S. PATENT DOCUMENTS

| | | | |
|---|---|---|---|
| 5,239,739 A * | 8/1993 | Akeel et al. ....................... 29/430 |
| 5,536,128 A * | 7/1996 | Shimoyashiro et al. ....... 414/273 |
| 5,595,263 A * | 1/1997 | Pignataro ......................... 186/53 |
| 5,630,072 A * | 5/1997 | Dobbins .......................... 705/22 |
| 5,886,634 A * | 3/1999 | Muhme ....................... 340/572.1 |
| 5,912,818 A * | 6/1999 | McGrady et al. ............. 700/232 |
| 6,598,025 B1 * | 7/2003 | Hamilton et al. ............... 705/22 |
| 6,736,316 B2 * | 5/2004 | Neumark ....................... 235/383 |
| 6,748,292 B2 * | 6/2004 | Mountz .......................... 700/214 |
| 7,044,373 B1 * | 5/2006 | Garber et al. ................. 235/385 |
| 7,099,895 B2 | 8/2006 | Dempsey |
| 7,356,495 B2 * | 4/2008 | Beigl et al. ....................... 705/28 |
| 2003/0163394 A1 * | 8/2003 | Munn ............................... 705/28 |
| 2004/0182924 A1 * | 9/2004 | VerEecke et al. ............. 235/385 |
| 2006/0058912 A1 * | 3/2006 | Karlen ........................... 700/214 |
| 2006/0102645 A1 * | 5/2006 | Walker et al. ................... 221/75 |
| 2006/0122881 A1 * | 6/2006 | Walker et al. ................... 705/14 |
| 2006/0277202 A1 | 12/2006 | Dempsey |
| 2007/0176782 A1 | 8/2007 | Mohalik |
| 2008/0131255 A1 * | 6/2008 | Hessler et al. ............. 414/788.1 |

OTHER PUBLICATIONS http://web.archive.org/web/20050812010331/http://www.mobileframe.com/.*

* cited by examiner

*Primary Examiner* — Ryan Zeender
*Assistant Examiner* — Dana Amsdell
(74) *Attorney, Agent, or Firm* — Robert C. Kowert; Meyertons, Hood, Kivlin, Kowert & Goetzel, P.C.

(57) ABSTRACT

Positional placement guidelines for storing items in an inventory area may allow determination and tracking of the position of the items in the inventory area. Position information may be associated with each item in a materials handling facility to assist in locating an item in an inventory area. The position information may represent a position relative to the inventory area and/or to the other items therein. Position information may be determined based on a count of items in the inventory area or based on a time stamp corresponding to the time the item was stored in the inventory area. Position information may be presented to an agent to facilitate picking the item with or without descriptive information. Feedback may provide an indication that the position information is incorrect and may trigger a review or a reset of position information for one or more items in the inventory area.

52 Claims, 12 Drawing Sheets

POSITION-BASED ITEM IDENTIFICATION IN A MATERIALS HANDLING FACILITY

BACKGROUND OF THE INVENTION

1. Field of the Invention

This invention relates to materials handling systems such as order processing systems and, more particularly, to position-based item identification.

2. Description of the Related Art

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

The increasing scope of electronic commerce, fueled by the ubiquity of personal computers, the Internet, and the World Wide Web, has resulted in striking changes to the number of options open to customers to shop and pay for items. Virtual storefronts allow customers to view item information including features, specifications, appearance, pricing and availability from their own home or office. Such virtual storefronts have become commonplace even among wholesalers and retailers who may still maintain physical customer presences (i.e., brick-and-mortar storefronts). Additionally, many companies conduct business exclusively through virtual storefronts without maintaining any other form of customer presence, such as a physical storefront. Electronic commerce using virtual storefronts offers many advantages, such as lower cost overhead (e.g., due to lack of sales personnel, lack of physical storefronts, highly automated ordering processes, etc.), and a potential customer base limited only by the availability of communication networks.

When a customer places an order, one or several inventory items specified in the order must be retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, or other designation (including proprietary designations) may be stored together within inventory. In an inventory environment that includes a large number of many different items, it may be highly inefficient for a single employee to physically locate and pick every item for a given order. For example, different items specified in a given order may be stored at mutually remote locations within the inventory facility, which would require a single picking agent to traverse a long path through the facility.

In order to make better use of inventory stocking space, it may be desirable to stock different items together in a single storage location or stocking area. While increasing the efficient use of inventory space, such co-location of different items may increase the difficulty, and thus the time, of identifying and picking a particular item. When picking items from inventory, the picking agent may generally need to examine some number of co-located items in order to determine the specific item to pick. This can be time consuming in situations where numerous similar items are stored together. Additionally, several similarly titled or described items may be stored in a single inventory area, increasing the difficulty of identifying any particular item. For instance, if several CDs are entitled "Greatest Hits" and stored together, a picking agent may have to read the full title for each item in turn to identify the correct item. The extra time this requires may be significant when multiplied across the large number of orders fulfilled by a typical facility. Similarly, in a facility handling items for rent or sale, there may be a large number of similar-looking items, such as DVDs, stored together. A picking agent may have difficulty identifying particular DVDs from among multiple DVDs in a single inventory. Again, any extra time required to correctly identify a DVD becomes significant, since each DVD may be stored and picked many times, as it is rented and returned.

SUMMARY

In a materials handling facility, multiple, different product items may be stored together in a single inventory area, such as a shelf, rack, bin, or drawer. Items may be stored in inventory areas by an agent, either randomly or according to one or more guidelines, or an inventory area may be selected for each item automatically, such as by software executing on a control system, in some embodiments. An agent or control system may record the selected inventory area for each stored item in a product database, which may include a description, inventory location number, or other data representing the inventory area in which the item was stored, indexed by a product identification code, for example.

The use of one or more guidelines specifying where items are placed within the inventory areas may allow position information to be used to facilitate locating and retrieving an item in the inventory area. For example, a guideline may specify that items be always added on the right side of any items already present in a specific inventory area. In another example, a guideline may specify that items be always placed on top of a stack of items in the area. In yet another example, items may always be added to the front of a line of items that are arranged front-to-back in an inventory area, such as on a deep shelf.

When items are stored in an inventory area, an inventory management system may be configured to associate an identifier of the item with an indicator of the item's absolute or relative position within the area, in some embodiments. This position indicator may be stored in a database, along with the product identification code and/or an indicator of the inventory area, in some embodiments. In some embodiments, the indicator may represent a count or index of the items in the inventory area. For example, a counter associated with the inventory area may be incremented each time an item is stored in the inventory area and may be decremented each time an item is removed from the inventory area. In some embodiments the incremented value of the counter (the current count value) may be associated with the new item when it is stored. In some embodiments, when an item is picked (i.e., removed) from the inventory area, the count value associated with one or more of the other items in the area may updated to reflect that the item has been removed. By incrementing and decrementing a counter and associating count values with each item in the inventory, as described, an inventory management system may keep an updated count of the items in each inventory area, in some embodiments. In embodiments in which positional placement guidelines are used, the count values associated with each item may indicate the item's current position within the inventory area. For example, if items are always added to the right of the items already in the area, the count value of each item may indicate its position relative to the left-hand side of the inventory area. The count values associated with each item may also allow the system to determine an item's position relative to other items in the inventory area.

An inventory management system may be configured to use a time stamp as an indicator of an item's position, rather than a count or index, in some embodiments. In such embodiments, when an item is placed in an inventory area, a time stamp may be associated with a product identifier of the item. This time stamp may be captured as part of the normal stowing operation, in some embodiments, such as if an item identifier and an inventory area indicator are scanned when an item is stored and the time is automatically captured at the time of the scanning. The time stamp may be stored in a database, along with the product identification code and/or an indicator of the inventory area, in some embodiments.

Capturing and storing a time stamp when each item is stored in an inventory area may allow an inventory management system to determine the order in which items were stored in the inventory area. In embodiments in which positional placement guidelines are used, the time stamp values associated with each item may indicate the item's current position within the inventory area. For example, if items are always added to the right of the items already in the area, the relative time stamp value of each item may indicate its position when referenced to the left-hand side of the inventory area. The time stamp values associated with each item may also allow the system to determine an item's position relative to other items in the inventory area. In embodiments in which a time stamp is used as a position indicator, the time stamp values for each item may not be updated when an item is removed, since the product identifier (and associated time stamp) for the removed item may be disassociated with the inventory area.

A picking agent may be provided instructions to locate and obtain a particular item from an inventory area. In some embodiments, the picking agent may utilize a communication device configured to present picking instructions, including the location of the inventory area in which the item is stored, and information representing the item's position within the inventory area. The presented position information may include a description of the item's position with reference to the overall inventory area or relative to other items in the same inventory area, in some embodiments.

For example, in one embodiment, a picking agent may use a portable, handheld communication device configured to present instructions for locating a book from a particular inventory area, such as a shelf of books. The particular shelf may store different books in different formats by different authors. In one embodiment, a communication device may present position information indicating or describing the item's position within the inventory area, such as "third item from the left" in order to facilitate locating and picking the correct book. In another embodiment, the communication device may present position information indicating the item's position relative to a more recognizable item or a marker item stored within the area, such as "second item to the left of *War and Peace*" or "first item to the right of the orange marker." Using the presented position information, the picking agent may be able to quickly locate an item, such as a book, DVD, music CD, a software CD, or another item to be picked, which may be stored among other similar-looking items in the inventory area.

In some embodiments, the position information may be presented along with pattern information to further distinguish between otherwise similar items. This pattern information may include information such as color patterning, which may represent the item's primary color scheme, artwork on the item's packaging, or perhaps the color of text on the item or the item's packaging, in some embodiments. In other embodiments, pattern information may correspond to an indicator applied to the item or its packaging. According to some embodiments, the presented position information may only be a general indication of the position within the inventory area, such as "left half," which, when presented along with the title and/or other descriptive information (size, color, etc.), may be enough to allow the picking agent to quickly locate and pick the correct item. In yet another embodiment, the position and/or pattern information may be presented in an auditory fashion, through voice recordings, or via a text-to-speech mechanism.

Position information for items in each inventory area of the materials handling facility may be stored in a central database or other repository of product information, according to some embodiments. For example, a computer-based control system may load the position information from the central database and send it to a picking agent's communication device. In some embodiments, such a control system may be configured to determine the amount of position and other information to be presented for the picking agent.

Position-based item identification may be used in a facility handling items for a rental service, in some embodiments. Any tasks associated with determining initial position information, such as adding position information to a database for items that were stowed without applying position-dependent storage guidelines, may only need to be performed once, whereas the re-stocking and picking of each item, which may be made more efficient through the use of position-based identification, may be repeated many times for each item as the item is repeatedly rented and returned.

An inventory management system may be configured to receive feedback indicating if the position information presented during a picking operation is correct, in some embodiments. If the position information presented is not correct, e.g., the item is not in the position indicated by the presented position information, the system may be configured to reset position information associated with one or more items in the inventory area or to mark it as suspect, in some embodiments. In other embodiments, an indication that presented position information was incorrect may prompt a manual or automated review of the contents of the inventory area.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
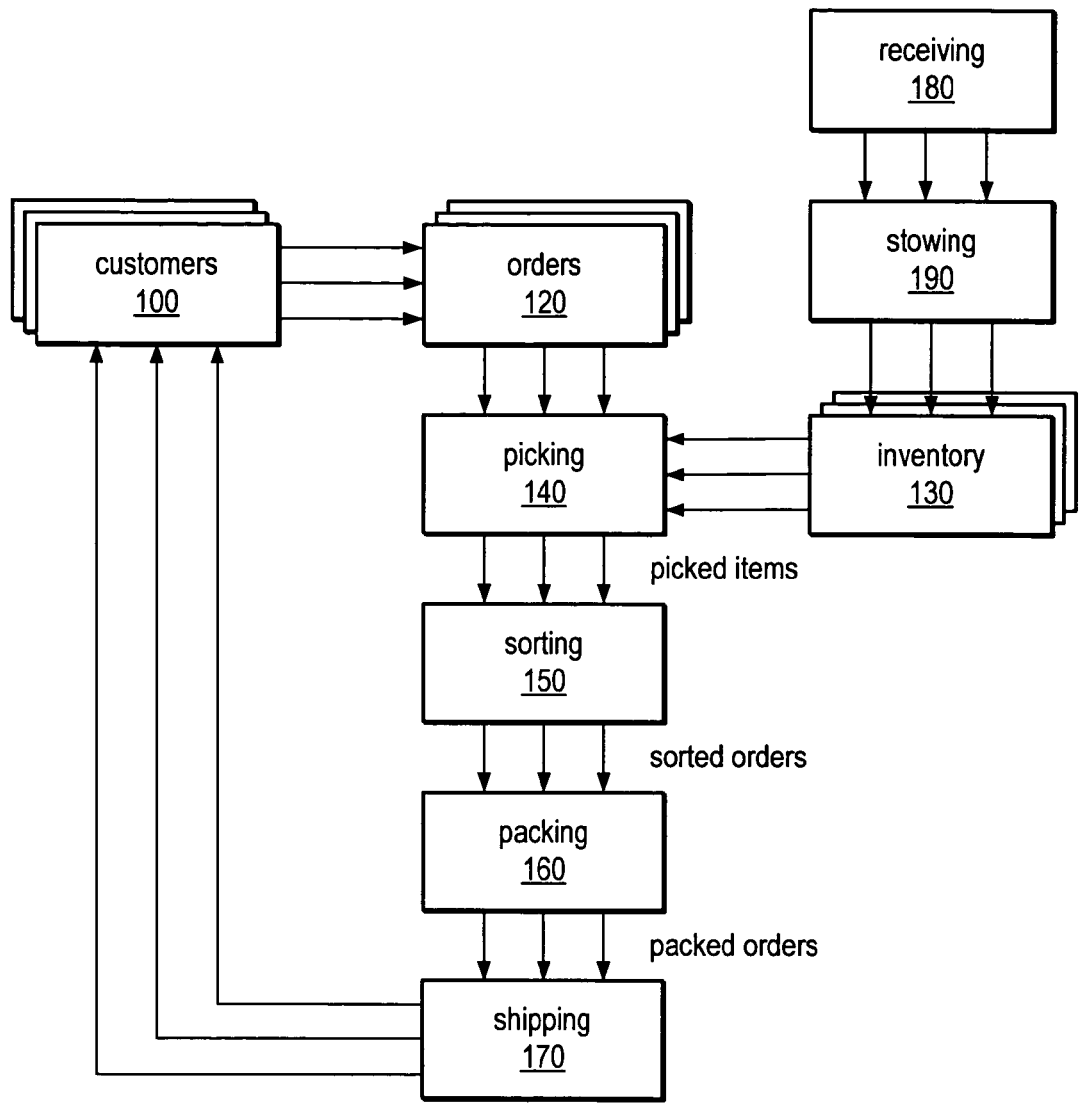
FIG. 1 illustrates a broad view of the operation of an order fulfillment facility, in one embodiment.

An order fulfillment facility or other materials handling facility may include an inventory management system employing position-based item identification. FIG. 1 illustrates a broad, exemplary view of the operations of one such facility, which, in one embodiment, may be configured to utilize position-based item identification as described herein. In this example, multiple customers 100 may submit orders 120 to the distributor of the items in the facility, where each order 120 specifies one or more items from inventory 130 to be shipped to the customer that submitted the order. To fulfill the customer orders 120, the one or more items specified in each order may be retrieved or "picked" from inventory 130 (which may also be referred to as stock storage) in the order fulfillment facility, as indicated by block 140. In some embodiments, items may be identified from inventory based on presented position information as described herein. Picked items may be delivered to one or more stations in the order fulfillment facility for sorting 150 into their respective orders, packing 160, and finally shipping 170 to the customers 100. Note that a picked, packed and shipped order does not necessarily include all of the items ordered by the customer; a shipped order may include only a subset of the ordered items available to ship at one time from one inventory-storing location.

An order fulfillment facility typically also includes a receiving operation 180 for receiving shipments of stock from various vendors and a stowing operation, illustrated as stowing 190, for placing the received stock into stock storage (inventory 130.) In some embodiments, stowing 190 may involve applying positional placement guidelines when adding items to one of the plurality of inventory areas in inventory 130. These positional placement guidelines may in some embodiments enable the use of position-based item identification, as described herein. In some embodiments, an order fulfillment center may receive an order for an item not currently in the center's inventory. When the item is received, the order may then be filled and shipped. When an order is received for an item before the item has been received at an order fulfillment center, the received item may or may not be stocked into inventory before being matched up with the order and shipped out, according to various embodiments. The receipt of the item at the facility may trigger the fulfillment process for a pending order. Note that the various operations of an order fulfillment facility may be located in one building or facility, or alternatively may be spread or subdivided across two or more buildings or facilities.

Position-based item identification as described herein in various embodiments, may be used to locate a given item to be picked from inventory 130. For example, in some embodiments, fulfillment center personnel, sometimes called agents, who retrieve ordered items from inventory 130, may use position information to quickly locate specific items in inventory 130 without, for example, having to read an item label, such as a book or CD title. Position-based item identification as described herein may also be utilized in a number of different facilities and situations, including, but not limited to material handling facilities, order fulfillment centers, rental centers, distribution centers, packaging facilities, shipping facilities, libraries, museums, warehouse storage facilities, etc. In general, position-based item identification may be used in any situation where one item must be located in an inventory area containing other different items.

Please note that the arrangement and order of operations illustrated by FIG. 1 is merely one example of many possible embodiments of the operation of an order fulfillment facility utilizing position-based item identification. Other types of materials handling, manufacturing, or order fulfillment facilities may include different, fewer, or additional operations and resources, according to different embodiments.

Figure 2:
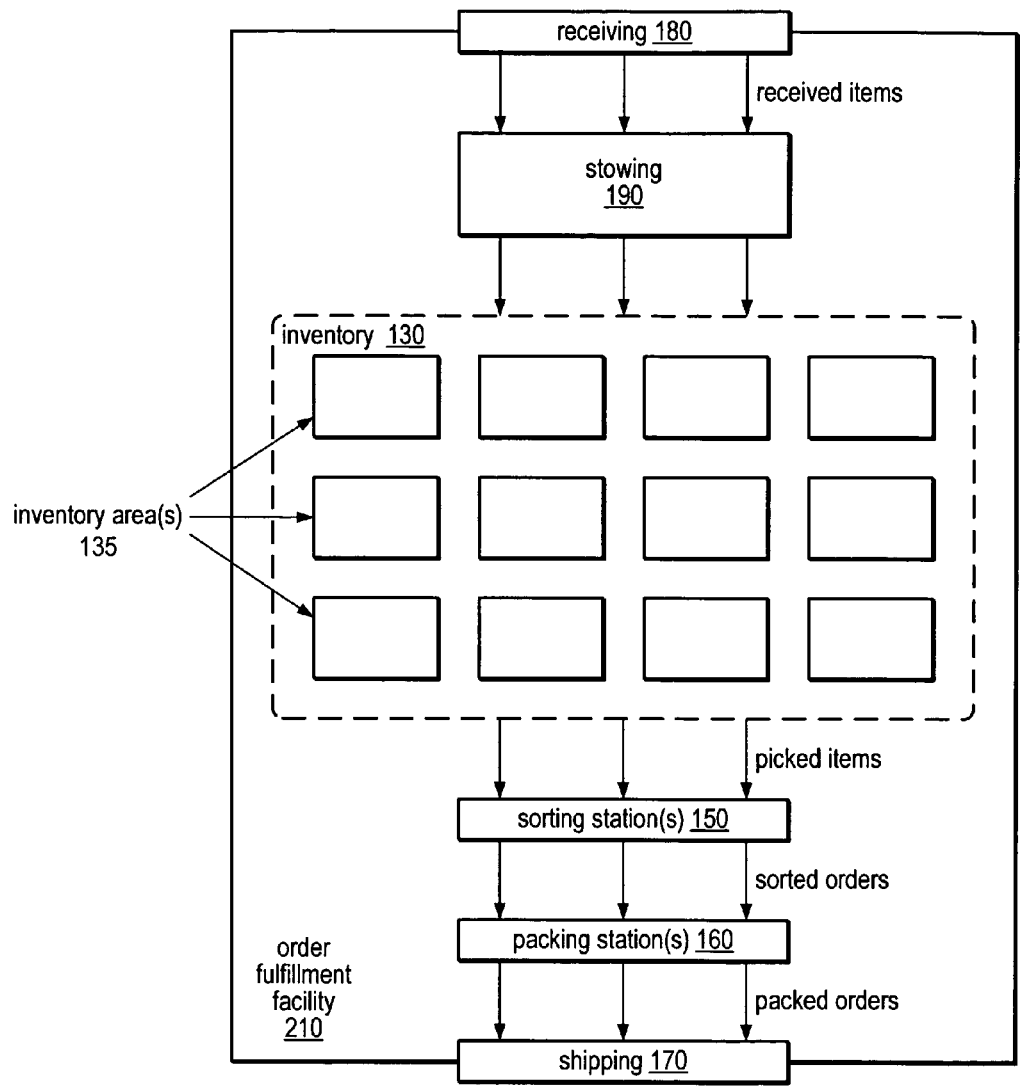
FIG. 2 illustrates one embodiment of an exemplary physical layout of an order fulfillment facility.

The stations of an order fulfillment center may be arranged in many different configurations, according to various embodiments. FIG. 2 illustrates a physical layout for an exemplary order fulfillment facility 210, according to one embodiment. At any time, one or more agents may each be picking items from inventory 130 to fulfill portions or all of one or more orders. According to some embodiments, the agents picking items from inventory 130 may utilize position-based item identification to increase speed and efficiency when locating items from among different items that may be co-located in a single inventory area 135. According to some embodiments, each picking agent may be provided with picking instructions directing them to locate and obtain one or more items from inventory 130.

As described above, many fulfillment facilities store different copies of items in different individual inventory areas 135 within inventory 130. Storing copies of items in multiple inventory areas 135 may shorten the distance, and therefore the time, required to obtain an item from inventory, in some embodiments. Additionally, different items may be stored in a single inventory area 135, according to certain embodiments. Storing different items together may result in more efficient use of total inventory space than using a single inventory area for a multiple copies of a single item or product. It still may be beneficial in some embodiment to store similar items together to make better use of inventory space. For example, storing different books together on a single inventory shelf may use the available inventory space more efficiently than storing one book among other items of greatly differing size and shape, such electronic devices, clothing, or other items. Thus, in some embodiments, a fulfillment facility may store items of similar shape and size together in a single inventory area. For instance, in such an embodiment, items such as books, compact discs (CDs), and digital video discs (DVDs) may all be stored together. In some embodiments, multiple copies of an item may be stored together with multiple copies of other, different items. For example, a single inventory area may store multiple copies for each of several different books, CDs, or other items.

In certain embodiments, items may be randomly stored together in inventory areas. Such random storage may increase storage efficiency and may in some cases increase the likelihood that any individual item may be easily distinguished from the other items with which it is stored. Random storage of items may also decrease the amount of time needed to store individual items into inventory. For example, using random or pseudo-random storage may obviate the need for a time consuming, facility-wide, sort process for each item being stocked, which is frequently required by systems that store a single item per inventory location. Furthermore, storing items randomly, or in multiple different areas with other items, may also decrease the distance traveled to store each item by an inventory stocking agent. A control system for the facility may track where each item is stowed.

In some embodiments, items may be stored together based on their distinguishability from each other. In some embodiments, determining where to store an item may be performed manually, while in other embodiments, it may be an automatic process performed by one or more computer software programs based on pattern information associated with the individual items, as described below.

When obtaining a particular item from an inventory area storing different items, picking agents may have to carefully examine each item in the inventory area to properly identify the specific item to be picked. For example, if a picking agent is instructed to obtain a single copy of a book that is stored among other different books, the agent may have to read the title of each book in turn to identify the specific book to pick. The time required to read multiple book, CD, or DVD titles, when multiplied over the hundreds or thousands of items that a picking agent may have to identify in a single day, may add up to quite significant additional time in some embodiments. The extra time required to identify a specific item may be increased even more if the items stored together are very similar. For example, it may take a picking agent additional time to distinguish from among multiple, different CDs all of whose titles include "Greatest Hits." For example, in one embodiment, a picking agent may be instructed to obtain a copy of "Bach's Greatest Hits" on CD, from an inventory area also storing other CD's, one or more of which may also include "Greatest Hits" in their titles. When using position-based item identification, a picking agent may consult presented position information corresponding to the relative position of the item to be picked, rather than having to carefully read the title of each CD in the inventory area until the correct one is encountered, according to some embodiments.

In some embodiments, the presented position information may indicate the position of an item with reference to the inventory area itself, such as "$2^{nd}$ book from the right," "$3^{rd}$ CD from the front," or "$4^{th}$ shirt from the top." In other embodiments, the presented position information may indicate the item's position with reference to other items in the inventory area, such as "$3^{rd}$ book to the right of *War and Peace*," or "$2^{nd}$ shirt below green jeans." In still other embodiments, presented position information may indicate the item's position with reference to a non-product item placed in the inventory area to facilitate position-based item identification, such as a shelf divider or a colorful insert placed between two items. In these embodiments, presented position information may include, for example, "$2^{nd}$ book to right of orange divider," or "$3^{rd}$ CD behind yellow insert."

Position information may be presented on a suitably equipped computer device, as will be described below, or may be printed out in a printed "pick list" of items to be obtained from inventory, or in general provided to the picking agent in any of a number of suitable formats, according to various embodiments. For example, in one embodiment position information may be displayed graphically (or textually) on a graphical display or monitor of a suitable computer device. In another embodiment position information may by presented auditorily using speakers of a suitable computer device. In yet another embodiment, position information may be presented graphically, textually, and auditorily.

In some embodiments, position information may be presented along with other descriptive information, such as a title or product name, or pattern information representing an intrinsic or assigned pattern that may be used to visually distinguish the item from others in the inventory area. This pattern information may include a color and/or shape pattern based on a view of the item, a color and/or shape pattern representing a color of a package or wrapper enclosing the item or an indicator applied to the item or its packaging, or a scanned or photographic image of the item, according to various embodiments. In some embodiments, a textual, graphical, or auditory representation of pattern information may be presented alone or in combination with other presented pattern or position information. For example, a DVD may be enclosed in a blue clamshell-style case and/or have a sticker printed with a star shape attached to the case. In another example, a software CD case may have a tag attached that is printed with a blue star. In some embodiments, presented pattern information for these examples may include graphics representing "blue" and "star". In another example, position information, such as "left half," and pattern information, such as representing a blue star, may both be presented to a picking agent. In other embodiments, the words "blue star" may be presented as pattern information and text indicating "second from left" may be presented as position information.

After obtaining items from inventory 130, agents may transfer those items to sorting stations 150, according to one embodiment. Please note, that not every fulfillment facility may include both sorting and packing stations. In certain embodiments agents may transfer picked items directly to a packing station, such as packing station 160, while in other embodiments, agents may transfer picked items to a combination sorting and packing station (not illustrated). This may result in a stream and/or batches of picked items for multiple incomplete or complete orders being delivered to a sorting station 150 for sorting into their respective orders for packing 160 and shipping 170, according to one embodiment illustrated by FIG. 2. Note that portions of an order may be received at different times, so sorting 150 and packing 160 may have to wait for one or more items for some orders to be delivered to the sorting station(s) 150 before completion of processing of the orders. The stream or batches of incoming picked items may be sorted into their respective orders at the sorting station(s) 150. While, in some embodiments, automated sorting may be utilized, such as through the use of Crisplant® or Eurosort® sorters, in other embodiments sorting may be performed manually. In yet other embodiments, both manual and automatic sorting may be used in combination.

Sorting may include an intake operation and an output operation. An intake operation may include picking an item and identifying it. A first type of intake operation may occur from a location containing a single type of item. A second type of intake operation may occur from among multiple different items, with the sorter instructed to intake a specific item. An output operation may include putting the item into an appropriate location, at which point sort is complete. A first type of the output operation may put the item to a single location, and a second type of the output operation may require the sorter to select a location to put the item from among multiple locations. Note that sorting only occurs when the second type of intake operation and/or the second type of output operation is performed. A combination of the first type of intake operation and the first type of output operation may be considered as a move of the item from one location to another, not a sort. Position-based item identification may facilitate sorting situations involving the second type of intake operation where position information may be used to facilitate selection of a specific item from among multiple different items. There may be no need to employ position information for sorts using the first type of intake operation since item selection is trivial. Once an order is completed at a sorting station 150, the order may be ready to proceed to a packing station 160 to be packaged for shipping 170.

An order fulfillment facility such as an order fulfillment center 210 may implement an order fulfillment control system, or control system for short, as part of its overall inventory management system. A control system (such as illustrated in FIGS. 4 and 5A through 5D, discussed below) may include hardware and software configured for assisting and/or directing agents in the order fulfillment center 210 in fulfilling customers' orders. Items in inventory 130 may be marked or tagged with a bar-code, radio frequency identification (RFID) tag, Universal Product Code (UPC), Stock-Keeping Unit (SKU) code, serial number, and/or other designation (including proprietary designations) to facilitate order fulfillment center 210 operations, including, but not limited to, picking 140, sorting 150 and packing 160. These designations, or codes, may identify items by type, and/or may identify individual items within a type of item. The control system may include, or may be used in conjunction with, hand-held, mobile and/or fixed scanners or scanning devices that may be able to scan the marks or tags on individual items to determine and record the item and/or item type of the items. In some embodiments, a control system may be configured to access position information for items and may provide position information to picking agents along with other information indicating items to be obtained from inventory, as will be described in more detail below.

As described above, an order fulfillment center may include one or more receiving stations 180 for receiving shipments of stock from various vendors. The received stock may then be placed into stock storage in one or more inventory areas 135 of inventory 130, in one embodiment during a stowing operation (illustrated as stowing 190 in FIG. 1.) During stowing 190, items may be stowed in inventory areas 135 according to one or more positional placement guidelines, according to different embodiments. When an item is stowed, an indicator of position may be stored in a product database and associated with a product identification code or other item or product information, in some embodiments. According to certain embodiments, the position information may then be available to control system devices, communication devices, or other computer devices, as described below.

Figure 3A:
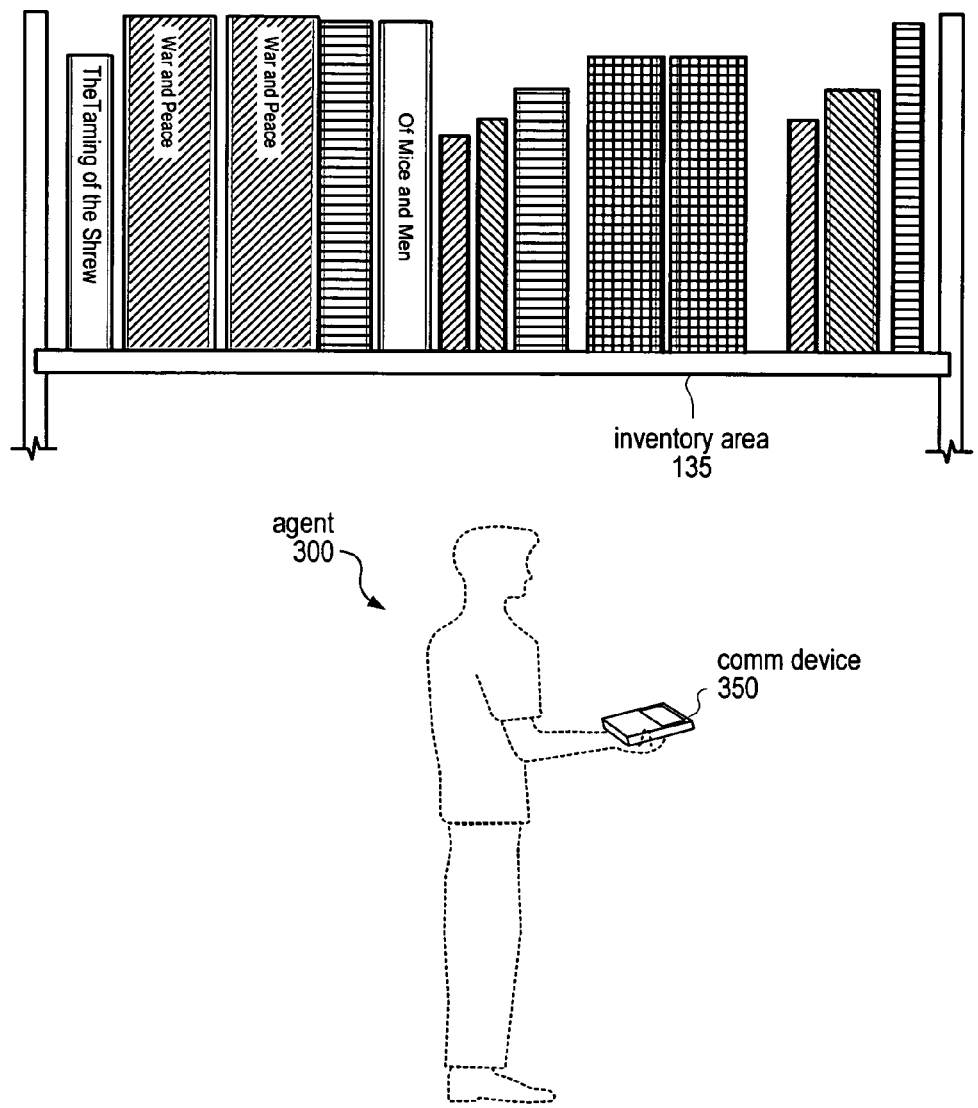
FIG. 3A illustrates a picking agent using a communication device to identify an item at an inventory area, according to one embodiment.

In one embodiment, a fulfillment center configured to fulfill orders may include a plurality of receiving stations configured to receive items for storage, a plurality of inventory areas configured to store the received items, and a plurality of packing stations configured to package items selected from the inventory areas. An agent may traverse the fulfillment center and may select each item from one or more of the inventory areas and may use position information associated with each item to locate that item within an inventory area and transfer it to one of the packing stations. As described above, a picking agent may use a communication device to identify an item at a single shelf inventory area, according to one embodiment. FIG. 3A illustrates a picking agent using such a communication device. Picking agents may, in some embodiments, receive and view picking instructions and position information via a communication device, such as communication device 350. In one embodiment, communication device 350 may receive position information to present from a control system controlling the filling of orders, as will be described below regarding FIG. 5A.

When picking an item from an inventory area, the agent may have a difficult time distinguishing the particular item from among other different items in the same inventory area. For example, an agent 300 may be instructed to pick a copy of *Of Mice and Men* by John Steinbeck from inventory area 135. In some embodiments different items may be stored together, as illustrated by inventory area 135 in FIG. 3A. For example, a single inventory storage area, such as inventory area 135 may store multiple copies of some items, such as two copies of *War and Peace*, together with one copy each of other books and items, such as *The Taming of the Shrew*, and *Of Mice and Men*, in inventory area 135, in FIG. 3A.

In certain embodiments, inventory areas may store items in multiple rows, one behind the other or in multiple stacks, arranged side by side. In one embodiment, an inventory area may be equipped and configured to automatically position, via any of a number of conveyance means (such as via springs, rollers, belts, slides, gravity, etc), an item at the front of the inventory area and to move a second item into the front position if the front item is removed from the inventory area. In other embodiments, inventory areas may be equipped with storage equipment configured to store items vertically as well as horizontally. Additionally, in some embodiments, the items stored among the various shelves of 135 may be sufficiently different that all the shelves together may be considered a single inventory area. In other embodiments, however, each individual shelf (or bin, drawer, etc) may be considered a single inventory area when using position-based item identification.

In some embodiments, the agent may be using a portable communication device, such as communication device 350, which presents instructions and position information regarding items to be picked. In a traditional order fulfillment facility, the agent may have to read the title of each book stored in the inventory area to determine the correct item to pick. When using position-based item identification as described herein, however, agent 300 may be able to use position information presented on communication device 350, or provided in another manner, to quickly locate the correct item to pick, according to some embodiments. For example, in one embodiment agent 300 may be instructed to obtain a copy of *Of Mice and Men* and communication device 350 may present position information indicating that this book is the fifth item from the left in inventory area 135. Thus, agent 300 may be able to quickly locate and retrieve the correct book from among the other books also located in inventory area 135.

Position-based item identification may reduce or eliminate the need for an agent to use a title, description, or any other time-consuming identification process to locate the correct item, in some embodiments. The use of position-based item identification may also allow inventory areas to store more items than when it is not used, thus saving inventory space. For example, items may be stored in one or more rows or stacks behind other rows or stacks, since an agent may not need to be able to see the items in order to locate the correct one by its position, whereas the items may need to be in plain sight to be identifiable by name, description, or pattern information. In certain embodiments, the use of position-based item identification alone may be sufficient to quickly locate inventory items. In other embodiments, position information may be presented in conjunction with other descriptive information, and the combination may facilitate efficient location of some items. Additionally, in some embodiments, a picking agent may use position-based item identification to locate an item and may then use a scan-code reader to verify that the correct item was located.

In one embodiment, communication device 350 may present position information graphically. When presenting position information graphically, communication device 350 may present the position information on a display or monitor either a part of or coupled to communication device 350. For example, communication device 350 may present, or display, an arrow and a number 5 corresponding to the position of *Of Mice and Men* in inventory area 135, described by way of example above.

In another embodiment, communication device 350 may present the position information in a textual fashion. In the example presented above, communication device 350 may, in one embodiment, present "5 from left" or "5L" to represent the position of *Of Mice and Men* described above. In another embodiment the position information may be presented textually using spoken voice, such as via text-to-speech technology. In some embodiments, the position information may be presented both textually and graphically. For example, communication device 350 may present an arrow and number 5 and also present the text, "5 from left," in one embodiment.

Figure 3B:
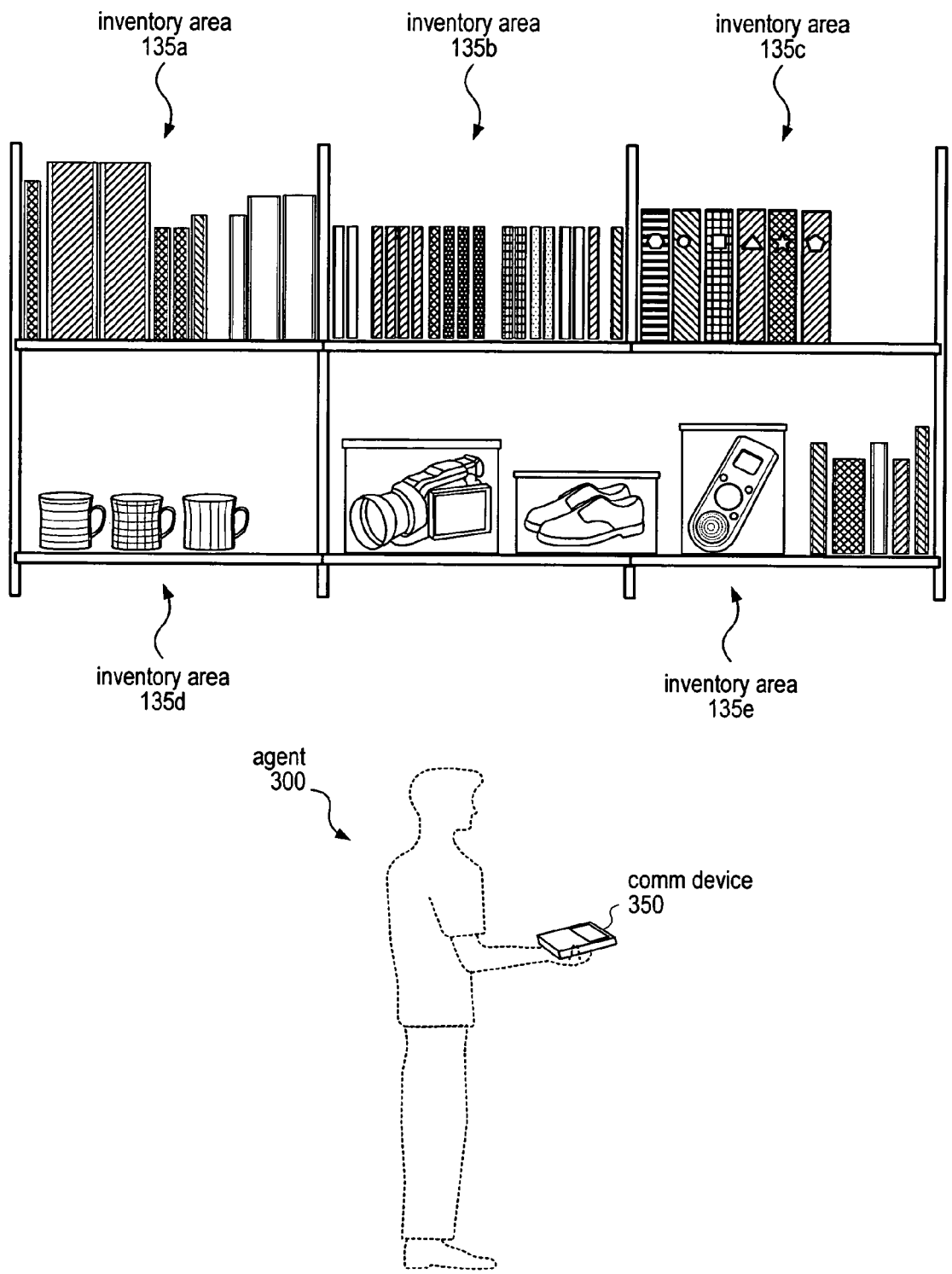
FIG. 3B illustrates a picking agent using communication device to identify various items from a multi-shelf inventory area, according to one embodiment.

FIG. 3B illustrates a picking agent using position information to locate items at a multi-shelf inventory area, according to one embodiment. Position information may be used to identify different types of items, according to different embodiments. While mainly described herein regarding the identification of items such as books, CDs, and DVDs, position-based item identification may be utilized with generally any kind of item, according to various embodiments. For example, position-based item identification may allow for efficient identification of a particular coffee mug from among different coffee mugs (e.g., "$3^{rd}$ mug from right") in one embodiment. In other embodiments, position-based item identification may allow for quick identification of one particular item of clothing from among different items of clothing hanging on a rack in an inventory area (e.g., "$2^{nd}$ hanger from left" or "$4^{th}$ sweater from right.") In general, position information may aid in the identification of virtually any item stored with other different items and may be especially beneficial when used to identify an item from among other similar items.

For example, position-based item identification may aid in identifying a book from among several books, as illustrated in inventory area 135*a*, or in identifying a CD from among other CDs in inventory area 135*b*, or a DVD from inventory area 135*c*. Additionally, position-based item identification may be used with other items such as to identify a particular cup or mug, as in inventory area 135*d*. Position-based item identification may also be used to identify items from more dissimilar items such as those illustrated in inventory area 135*e* (e.g., "$1^{st}$ box from left.")

In some embodiments, position information may be presented optionally and may not be presented for an item that is already easily distinguishable from other items. For example, an agent instructed to pick a video camera from inventory area 135*e* may not utilize any position information since an item description (e.g. "video camera") may be enough to locate the correct item, in one embodiment. However, position information may be presented for another item in the same inventory area, according to one embodiment. For instance, position information may be presented to locate one of the books that are also in inventory area 135*e* or to locate one of several video cameras (e.g., "video camera on left,") in different embodiments. In some embodiments, position information may be presented for certain items and not for others in the same inventory area, depending upon various similarities of an item to be picked to other items in the inventory area. Thus, in some embodiments, position information may be presented only if necessary. Only presenting position information when necessary may save network bandwidth or other computing resources, in certain embodiments.

In general, the amount and/or type of information (whether pattern or position information) provided to locate an item may vary based on knowledge about the item, the item's location, other items co-located with the item, and/or heuristics or other rules regarding how much information may be required to locate the item, according to various embodiments. In some embodiments, a control system may be configured to programmatically adapt the amount or type of information provided based upon the results of prior pickings of the same item, similar items, or other items previously picked by the same picking agent. For instance, a particular item may be more difficult than others to distinguish and thus additional information, such as both position and pattern information, may be supplied to help identify that item, in some embodiments. Additionally, in some embodiments, a particular agent may have difficulty distinguishing a particular item or type of item and the control system may adapt the amount and/or type of information supplied to that particular agent when picking certain items. For example, one agent may be able to quickly locate items using pattern information, while another agent may require both pattern and position information to quickly locate items for picking. In another example, one agent may more quickly locate items using position information, while another agent is able to identify items more quickly using pattern information. Thus, information regarding the results of previous pickings may be used to adapt the amount and/or type of information provided for future pickings, according to various embodiments.

In some embodiments, a single inventory area may store multiple items of similar shape and size that may be difficult to distinguish from each other, such as DVDs, music CDs, software products, or other items. In order for a picking agent to more easily distinguish between the items, position information, rather than visual information, may be used to locate the item. Although many of the examples described in conjunction with FIGS. 3A and 3B include DVDs, CDs, and software products, the same techniques may be applied to any other types of items picked from an inventory area, such as books, toys, clothing, hardware, materials, etc.

Figure 4:
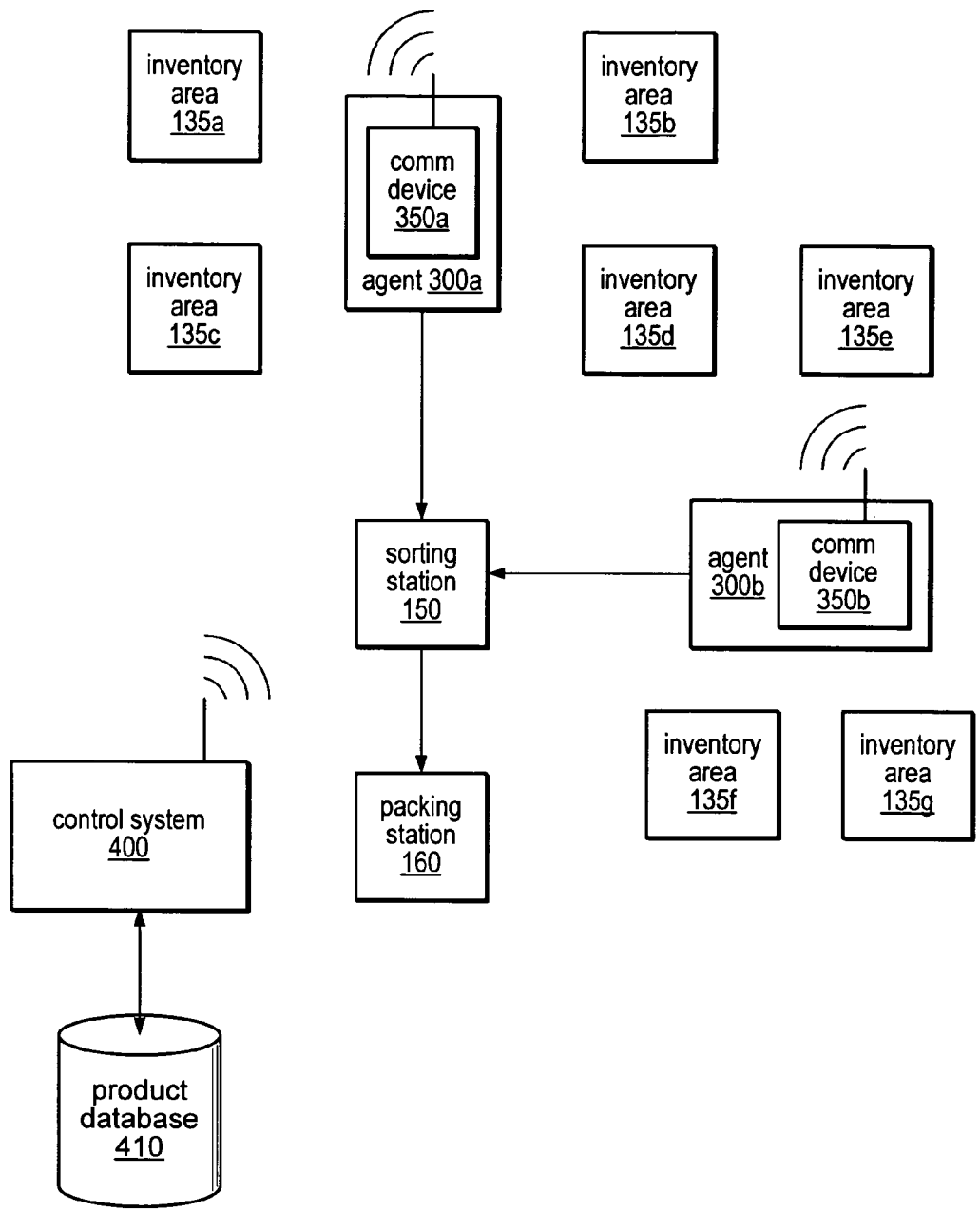
FIG. 4 is a block diagram illustrating multiple picking agents traversing a portion of a fulfillment center, according to one embodiment.

FIG. 4 is a block diagram illustrating exemplary paths of several agents through a portion of a fulfillment center, according to one embodiment. As described above, multiple pick agents (in this example, agents 300*a* and 300*b*), may be picking items at the same time in an order fulfillment facility and, for some orders, no single agent may pick all the items for a single order. Instead, in some embodiments, each of several agents may pick one or more items for an order and transfer those items to a sorting station. Position and/or pattern information may be provided to each agent to aid in locating items within the inventory areas, illustrated as 135a-135g, in one embodiment. In one embodiment, control system 400 may be configured to provide a picking agent, such as agent 300a or 300b, with picking instructions regarding one or more items to obtain from inventory. In some embodiments, control system 400 may also provide the picking agent with position and/or pattern information associated with an item to pick and the agent may locate the item based upon the information provided. In other embodiments, picking agent may be provided with position and/or pattern information from a source other than via control system 400.

For instance, in some embodiments, agent 300a may carry a portable communication device 350a, configured to present picking instructions and position information received from control system 400. In such an embodiment, control system 400 may consult product database 410 to determine an inventory area from which agent 300a should retrieve the item and may also load position information for the item from product database 410. In other embodiments, position information may be stored separately from other item information. In yet other embodiments, control system 400 may load position information across a network from another device configured to store and provide position information. Communication device 350a may receive both the pick instructions and the position information from control system 400, in any of a number of different manners, according to different embodiments, as will be discussed in more detail below regarding FIGS. 5A through 5D. In some embodiments, control system 400 and communication device 350a may each be configured to communicate wirelessly, allowing picking agents to move freely around a fulfillment facility while receiving picking instructions and position information.

Communication devices 350 may, in some embodiments, be configured to communicate with control system 400, for example via radio communication, wireless networking, and/or a wired communication protocol, to convey instructions from control system 400 to agents 300 as to what actions to perform within the order fulfillment facility. Communication devices 350 may also include, but are not limited to, one or more of: handheld devices, devices worn by or attached to the agents, and devices integrated into or mounted on any mobile or fixed equipment of the order fulfillment facility such as push carts, bins, totes, racks, shelves, tables, and work benches, according to various embodiments. Communication devices 350 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 400. In general, a communication device 350 may be any device that can communicate with control system 400 and convey instructions to agents 300. In one embodiment, at least some of the communication devices 350 may be configured to scan or otherwise read or receive codes or identifiers of various components in the order fulfillment facility and to communicate the entered codes to control system 400 for use in directing agents 300 in the various operations of the control center. Such components may include, but are not limited to, one or more of items, orders, modular sorting stations, modular bins, and compartments of modular bins.

Figure 5A:
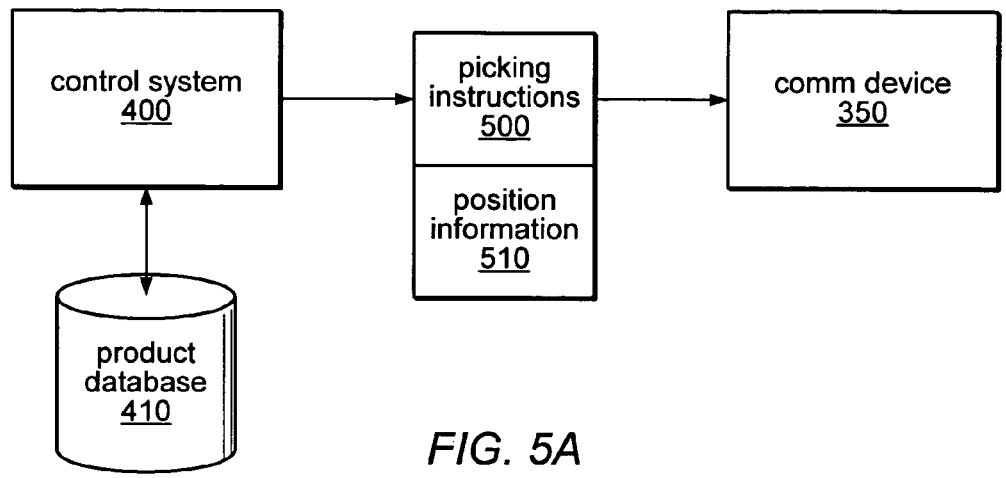
FIGS. 5A through 5D are block diagrams illustrating various embodiments of position information delivery from a control system to a communication device.
Figure 5B:
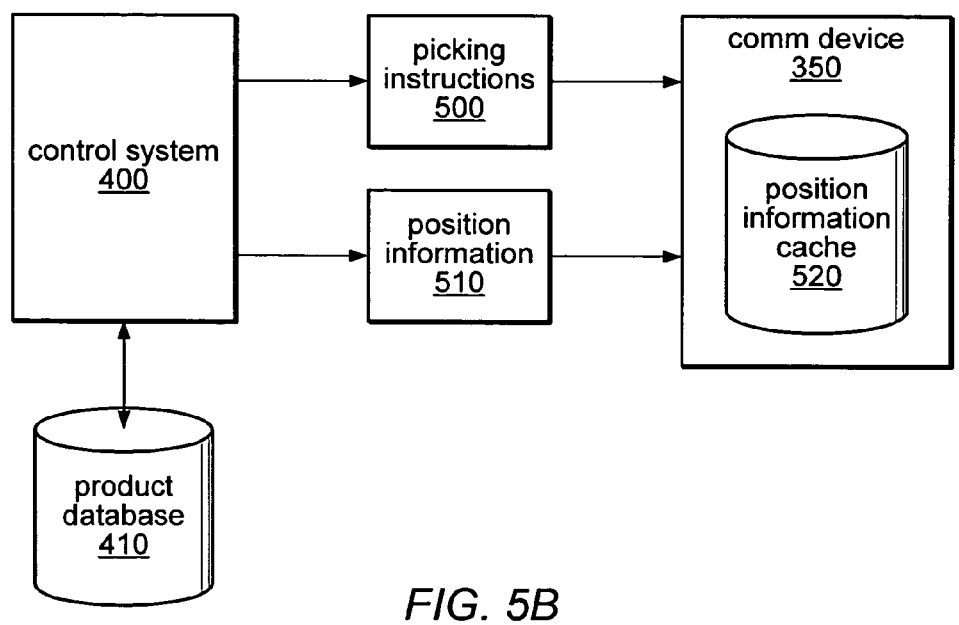

FIG. 5A is a block diagram illustrating one embodiment of position information delivery from a control system 400 to a communication device 350. Position information used as part of position-based item identification may be stored as part of a product database, such as product database 410, according to one embodiment. When instructing an agent to pick a particular item, control system 400 may, in some embodiments, be configured to access product database 410 and retrieve position information for the particular item to be picked. In some embodiments, control system 400 may send the position information along with the picking instructions directing the agent regarding which item to pick and where that item is located. Control system 400 may communicate with communication device 350 according to any of a number of different communication protocols, such as via TCP/IP, HTTP, 802.11, Bluetooth, etc. As illustrated in FIG. 5A, control system 400 may send a message including both picking instructions 500 and position information 510 to communication device 350, according to some embodiments. In one embodiment, control system 400 may send two separate messages, one for picking instructions 500 and one for position information 510. In another embodiment, control system 400 may save network resources by appending position information 510 to a message for sending picking instructions 500. In some embodiments, the number of bytes required to transmit position information 510 may be small enough, such as a single byte in certain embodiments, that attaching position information 510 to a message that is already being sent may be more efficient than the overhead required to send another message just for position information 510. For example, position information 510 may be small enough to insert into an unused field of an existing message, such as one used to send picking instructions 500, and may therefore be sent with no or almost no increase in required bandwidth, according to certain embodiments. In yet other embodiments, communication device 350 may store or cache received position information and may also be configured to locate and retrieve position information directly from product database 410, rather than relying upon control system 400 to provide it. This is illustrated in FIG. 5B and described in more detail below.

The actual amount of data needed to represent the position information may vary from embodiment to embodiment. For example, in one embodiment, the position information may be represented by graphic images of the position information, while in other embodiments the position information may be encoded and may thus require less data storage to represent the same information. For example, in one embodiment, a single byte may be able to encode the position information for most items. For instance, in one example, a count value associated with the item to be picked may be enough to allow an agent to efficiently locate the item from the inventory, if the count value always represents the distance (in terms of the number of items) from the same reference (such as a same side of the inventory area.) In this example, an item associated with a count value of 3 may be the third item from the left, and an item associated with a count value of 5 may be the fifth item from the left. Thus, in some embodiments, control system 400 may send only a single byte representing the position of the item to communication device 350.

In another example, different portions of the data (e.g., different sets of bits in a byte) may represent different aspects of the position information. For example, one nibble may represent a count value or distance from a given reference, while another nibble may indicate the reference itself, such as by specifying one or more of a side of the inventory area, a direction, a marker item or divider, a row or stack, etc. (e.g., "from left side," "from top," "to right of blue marker," "in second row", "in fourth stack", etc.)

Thus, in one embodiment, a single byte may be able to represent any combination of 16 distance counts and 16 different references. In such an embodiment, this may be enough to locate any particular item within any inventory area. Also in such an example, the facility may take care when stocking inventory to ensure that any individual inventory area contains few enough items that they may be located using 16 distance counts and 16 references. In other embodiments, different and/or more complex encoding schemes may be used. In some embodiments, different encoding schemes may be utilized in a single facility. Thus, for certain items in certain inventory areas, a single byte may be used to encode and send the position information, while for other items in other inventory areas, two or more bytes may be used for the position information. In embodiments in which both position information and pattern information are used, they may be encoded separately in a total of two or more bytes, or both position and pattern information may be encoded in a single byte, such as if each is encoded in one nibble of the same byte.

In some embodiments, control system 400 may send a graphic image of the position information to communication device 350. Transferring graphic images may, in some embodiments, allow the use of less powerful, or off-the-shelf, communication devices because presenting a graphic image may not require any analysis or interpretation of position information that may be needed to properly present encoded position information. When using actual graphic images, any of various common graphic formats may be used, such as Microsoft Windows bitmap (BMP), computer graphics metafile (CGM), graphic interchange format (GIF), PC Paintbrush format (PCX), JPEG file interchange format (JPEG), tagged image file format (TIFF), and/or many others. A graphic image of position information may, for example, include a diagram of a shelf or other inventory area type, along with a graphical depiction of position or direction, (e.g., an arrow) and/or a number indicating a count value corresponding to the item's position within the inventory area.

In certain embodiments, alphanumeric representations of position information may be used and thus control system 400 may send an alphanumeric string of the position information to communication device 350. In other embodiments, alphanumeric representations of position information may be determined by communication device 350 based on encoded position information. For example, a single byte may be used to represent the count value and reference point for an item to be picked, and communication device 350 may graphically and/or textually present an indication of the location of the item to be picked. In other embodiments, however, control system 400 may send both encoded position information and an alphanumeric string for the position information. In certain embodiments, control system 400 may send a graphic image of the position information as well as an alphanumeric string for the position. In embodiments in which both position and pattern information as used, they may be stored and/or sent in different formats. For example, position information may be stored and/or sent as encoded information and pattern information may be stored and/or sent as an alphanumeric string.

In some embodiments, control system 400 may be configured to send the position information to communication device 350 when the agent has arrived at the proper inventory area. In such an embodiment, control system 400 may be configured to receive an indication, either from the agent through communication device 350, through an RFID device, or through some other proximity detection system, that the agent has reached the proper inventory area. In other embodiments, control system 400 may send position information when sending the initial picking instructions to communication device 350. Thus, in some embodiments, control system 400 may send position information to communication device 350 prior to when the agent actually needs the information.

Subsequently, when the agent is ready to locate an item, communication device 350 may already have position information for the item. For example, control system 400 may supply position information for multiple items at one time, such as for multiple items located in a single inventory area, or located in multiple inventory areas in proximity to one another. In some embodiments, control system 400 may be configured to determine when an agent has entered a particular area or section of the inventory space and supply position information for all the items the agent is to identify in that area or section of inventory. In certain embodiments, providing position information prior to when it is actually needed by the agent may prevent the agent from having to wait for information to be received by communication device 350.

In other embodiments, communication device 350 may be configured to request the position information for the item to be picked. For instance, the agent may use a button or other user entry device connected to communication device 350 to signal that he/she has arrived at the inventory area to which he has been directed and is thus ready for the position information. Alternatively, agents may only request position information if and when it is needed. For instance, an agent may request position information if he is having trouble identifying or locating the correct item to be picked. In other embodiments, communication device 350 may be connected to a proximity awareness system and may thus be configured to automatically request position information when the agent is approaching the proper inventory area. In such an embodiment, communication device 350, control system 400 and/or a proximity awareness system may be configured to coordinate their functions such that an agent receives the position information when needed—thus mitigating the time the agent waits for the position information to be received and presented.

In some embodiments, communication device 350 may include sufficient resources to store position information for part or all of the items that may be picked. Thus, in such an embodiment, control system 400 may send pick instructions regarding an item to be picked and communication device 350 may be configured to access position information for that item from a local product database on communication device 350. Although the examples illustrated by FIGS. 5A-5D are described largely in terms of position information, in some embodiments the information provided to a picking agent may also include pattern information or any other descriptive information. In such embodiments, different amounts of position and/or pattern information (including none) may be provided and/or presented in any suitable format, according to various criteria.

FIG. 5B illustrates one embodiment for transferring position information where communication device 350 may be configured to cache received position information, such as if position information for multiple items to be picked is sent to communication device 350 in groups or batches. For example, control system 400 may send picking instructions 500 regarding an item to be picked to communication device 350. Communication device 350 may be configured to determine whether or not position information for the item to be picked is currently stored in position information cache 520 on communication device 350. In some embodiments, communication device 350 may store cached position information on a storage medium, such as system memory, flash memory, or hard drive, of communication device 350. In other embodiments, however, communication device 350 may be configured to store cached position information on a separate device accessible, perhaps wirelessly, from communication device 350. In some embodiments, communication device 350 may be configured to request position information for any item to be picked for which it does not have current position information stored locally.

Because position information may change over time as items are stowed and picked in each inventory area, guidelines or automated methods may be employed to keep cached position information current, in different embodiments. For example, in some embodiments, cached position information may "time out" after a specified time period, after which it is assumed to be out of date. This time period may be the same for all items and inventory areas or may vary by item type or inventory area, in different embodiments. For example, in a facility supporting book and movie rentals, the time-out period for movies may be shorter than the time-out period for movies, if there is a higher turnover rate for movies. In some embodiments employing an automated time-out, communication device 350 may be configured to automatically request current position information after the time-out period has passed for one or more items for which it contains cached position information, or control system 400 may be configured to send current position information to communication device 350 after the time-out period has passed. In other embodiments, communication device 350 may be configured to request current position information for an item only when the item is the next item to be picked and the time-out period has passed. In still other embodiments, no time-out period may be specified and/or the agent may explicitly request current position information at any time to refresh the cache in communication device 350.

If communication device 350 determines that current position information for an item does not exist in position information cache 520, such as if a time-out period has passed or no position information was cached for the item, communication device 350 may request position information for the item from control system 400 and in response, control system 400 may send position information 510 to communication device 350. Alternatively, if communication device 350 determines that position information cache 520 does contain current position information for the particular item, communication device 350 may load, present, and/or otherwise use the cached position information as if it had been received from control system 400.

In some embodiments, communication device 350 may be configured to cache position information only for the items to be picked soon, so as to avoid having the position information time-out before the items are picked. In such an embodiment, the number of items for which communication device 350 caches position information may be configurable, either by a system administrator or by an individual picking agent. Alternatively, the position information cache may be automatically managed by computer system 400 based upon available system resources, item types, inventory area turnover rates, time-out periods, etc. Thus, when it is time to pick the next item, communication device 350 may already have the current position information—thus saving additional time and network bandwidth. In certain embodiments, communication device 350 may be configured to cache position information only for a given number of items. For instance, when sending position information for multiple items, control system 400 may include in the message an indication of whether communication device 350 should cache position information for some or all of the items. In other embodiments, communication device 350 may be configured to cache position information for items only for a given time period, and then to request updated position information automatically if the item has not yet been picked.

Communication device 350 may in some embodiments be configured to cache different versions or amounts of pattern and/or position information for different items. In embodiments where the amount of information presented for locating and identifying a particular item may vary depending upon the other items stored together with the item, control system 400 may send an indication of the particular type or version of information required for any particular picking of that item. For example, both pattern and position information may be needed to quickly identify some items in some inventory areas. In some embodiments, pattern information may vary over time, such as if a second printing of a book has a different book jacket. In such embodiments, version information may be used to associate books from each printing with the corresponding pattern information. Thus, in such embodiments, communication device 350 may request additional or different information for an item if that particular version of information is not currently cached in position information cache 520. Additionally, in some embodiments, the physical appearance of other items stored together with an item may be used to determine the amount of information to present for the item to be picked. For example, in one embodiment, if a red item to be picked is stored together with other red (or reddish) items, more information, such as position information or additional pattern information, may be presented than if the item is stored with non-red items. The position of the item in an inventory area may also be indicated along with presented pattern information, according to certain embodiments.

Figure 5C:
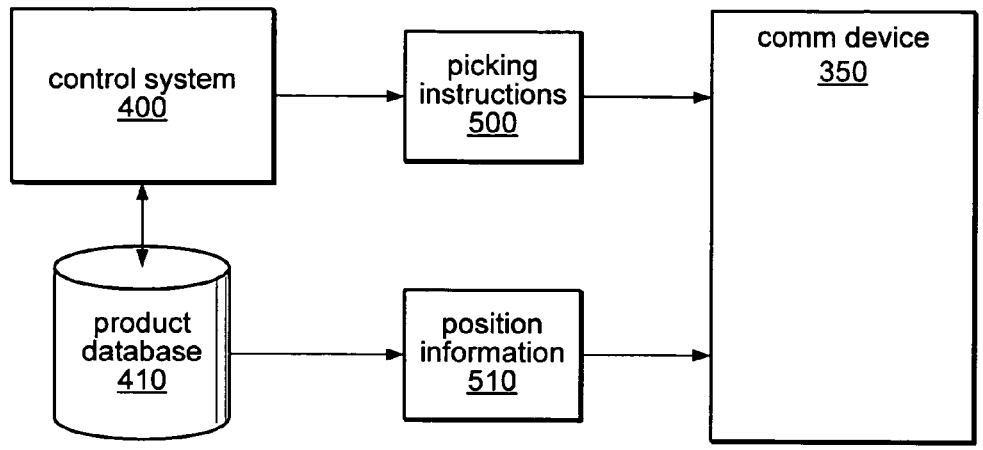

In some embodiments, communication device 350 may be configured to access a central database of pattern and/or position information in order to obtain information for an item to be picked. In such an embodiment, as illustrated by FIG. 5C, control system 400 may send communication device 350 instructions regarding which item or items to pick, and communication device 350 may be configured to retrieve the appropriate pattern and/or position information from a database, such as product database 410.

Figure 5D:
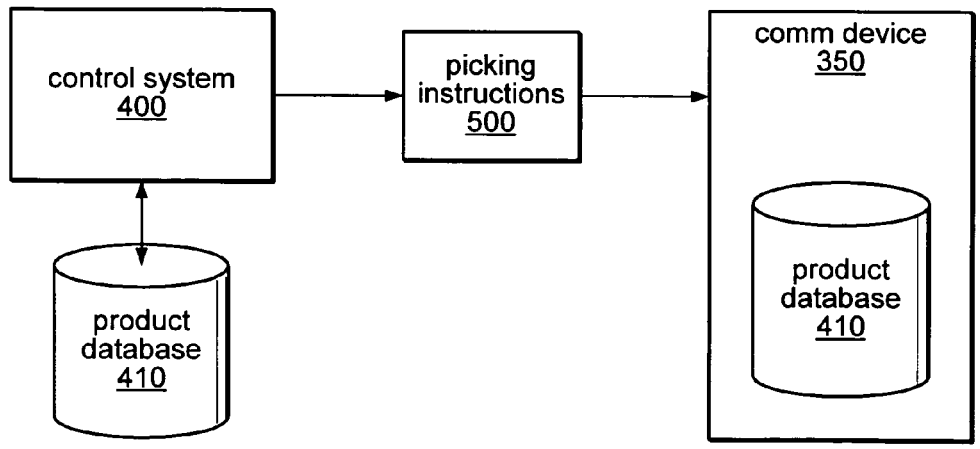

FIG. 5D illustrates a communication device 350 configured to store a complete product database 410 and which may have pattern and/or position information available for any item to be picked, according to one embodiment. In some embodiments, communication device 350 may maintain only pattern and/or position information in product database 410, while in other embodiments, communication device 350 may store additional item information, such as descriptions, SKU numbers, and the like. Thus, the amount of information regarding any particular item that control system 400 may send to communication device 350 may vary from embodiment to embodiment depending upon how much item information communication device 350 may be configured to store in a local product database 410. Additionally, in certain embodiments, communication device 350 may be configured to load pattern and/or position information for an item directly from a remote product database rather than to receive this information from control system 400.

In various embodiments, including those described above with respect to FIGS. 5A-5D, the presented position information may indicate an exact position of an item in relation to the other items in an inventory area. In other embodiments, however, only an approximation of the item's position may be included with presented position information. For instance, position information may indicate that an item (e.g., a book) is generally in the middle of an inventory area or that the book should be on the left side of a shelf of books. In some embodiments the position of an item may be presented as secondary information to presented pattern information, while in other embodiments the position of an item may always be included when presenting pattern information. In some embodiments, pattern information may indicate a relative size, either vertically, horizontally, or both, of the item in relation to the inventory area, such as a bin or shelf, in which it is stored or in relation to the size of other items in the same inventory area.

For example, pattern information may indicate that a book is the tallest item in the inventory area or the widest item on a shelf of items. Thus, in some embodiments, a combination of pattern and position information may indicate, for example, the "tallest book on left half" or the "widest box to right of orange divider."

In some embodiments, the minimum, or optimal, amount of information and/or the optimal type of information required to identify an item may be "learned" over time by control system 400, communication device 350, or another computer system at an order fulfillment facility. For example, control system 400, in one embodiment, may be configured to recognize that picking agents frequently, or always, require secondary information (whether position information or pattern information) when identifying a particular item, and control system 400 may automatically send secondary information for that item in the future.

Figure 6:
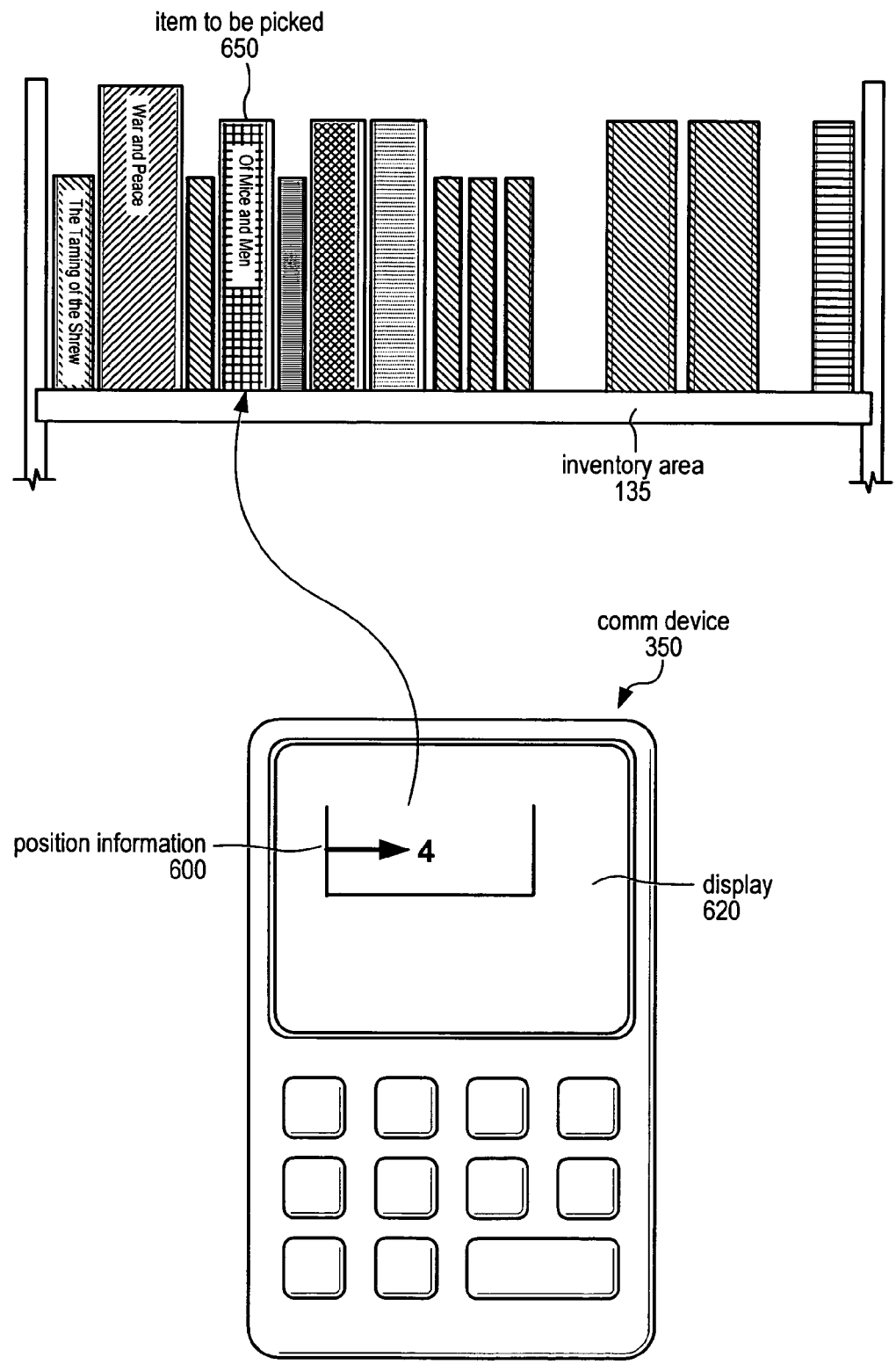
FIG. 6 illustrates a communication device presenting position information for an item, according to one embodiment.

One example of a communication device 350 presenting position information for an item to aid in locating that item is illustrated in FIG. 6. In this example, communication device 350 may present position information 600 on display 620. As illustrated, presented position information 600 may provide a graphic image usable to locate the item to be picked 650 from inventory area 135. In this example, the graphic image includes a diagram of a shelf (inventory area 135) and an indication that the item to be picked 650 is the fourth item from the left on the shelf (in this case an arrow and a number "4".) In other embodiments, position information 600 may be presented along with other descriptive information, such as text corresponding to a title or other product label, or pattern information corresponding to one or more elements of the visual view of the item to be picked 650 (e.g., size, shape, color.)

Communication device 350 may in some embodiments include different resources and may appear different from what is illustrated in FIG. 6. For example, in one embodiment, communication device 350 may include a head mounted display and may be configured for hands-free control. In other embodiments, communication device 350 may include a scan device for reading bar-type scan codes, such as an SKU or ISBN on an item. In yet other embodiments, communication device 350 may be configured to communicate with a separate scan device.

As noted above, pattern information may in some embodiments be presented along with position information 600. This pattern information may represent the color of an item or text, such as on the spine of a book, CD, DVD or other item's label, or may represent a shape or pattern printed on an attached sticker or tag, according to different embodiments. In some embodiments, pattern information may represent a color pattern, such as a device or logo, on the item and visible to a picking agent at inventory area 135. For instance, a publisher's logo may be visible on a book spine or a DVD case and pattern information may indicate the color and/or approximate size and location of such a logo. As described above, when position information 600 is presented, pattern information may or may not also be presented depending upon whether pattern information is required to locate and/or identify a particular item in the inventory area, according to certain embodiments. Alternatively, pattern information may be presented first, and position information may only be presented if the pattern information is not sufficient to identify the item, in some embodiments. For instance, if pattern information indicates a brown color, and there is more than one brown item of the same approximate size, then position information 600 may be presented in order to locate the correct item to be picked, in one embodiment. In other embodiments however, position information 600 may always be presented regardless of whether it may be needed to locate a particular item in an inventory area.

Figure 7A:
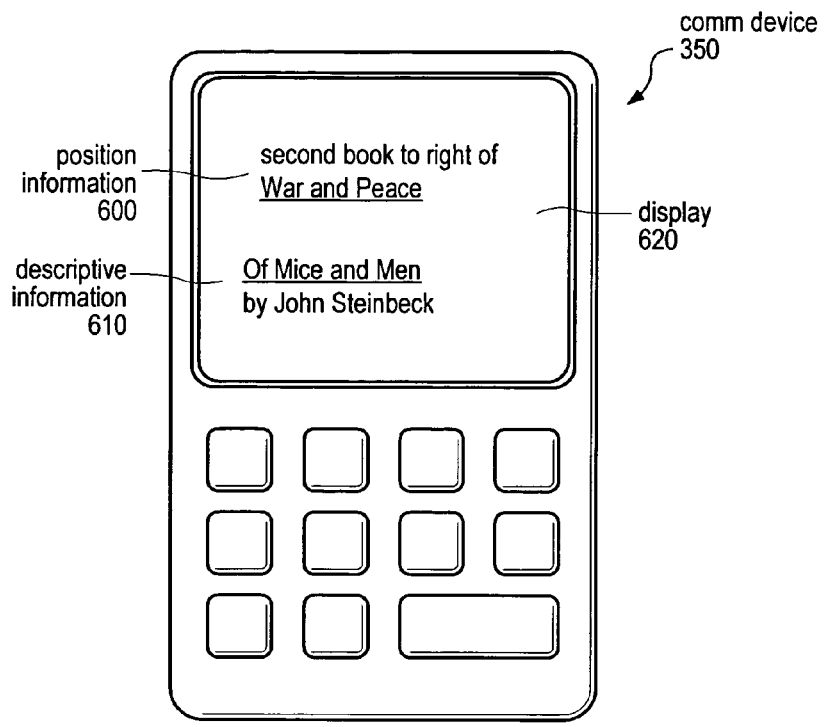
FIGS. 7A and 7B illustrate exemplary communication devices presenting various combinations of position information and descriptive information, according to different embodiments.
Figure 7B:
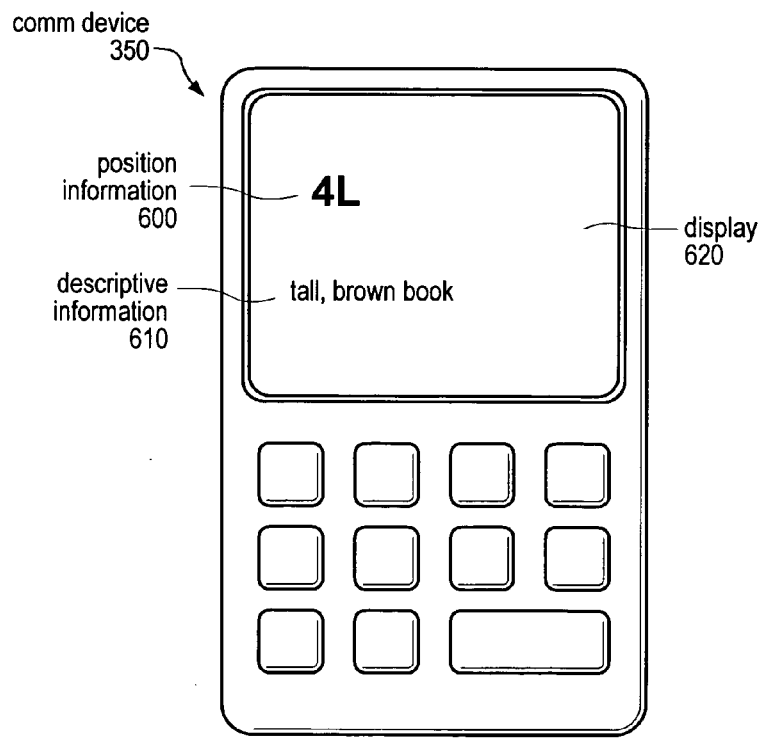

Thus, the amount and/or type of information supplied to communication device 350, and thus to an agent, may vary from item to item based upon various optimization rules, according to certain embodiments. For instance, control system 400 may include a set of rules, heuristics, or polices that determine the amount and type of information needed to locate, identify, or distinguish an item with at least a certain level of confidence. In some embodiments, control system 400 may be configured to perform various types of analysis, possibly in conjunction with optimization rules or policies, in order to determine the amount and/or type of information that should be provided when picking a particular item. Thus, in some embodiments, rather than always sending all the information available for an item, only a minimum amount of information, such as determined by optimization rules, heuristics or policies, may be initially provided to picking agents. FIGS. 7A and 7B illustrate two examples of presenting position information and other descriptive information to a picking agent, according to various embodiments.

In the first example, FIG. 7A illustrates a communication device 350 presenting position information 600 to an agent. In this case, presented position information 600 includes text indicating that the item to be picked 650 is the second book to the right of an easily recognizable (marker) item, *War and Peace*. The use of marker items in position-based item identification will be described in more detail below. In this example, communication device 350 also presents descriptive information 610 about the item to be picked 650. In this case, descriptive information 610 includes the title and author of the book, "*Of Mice and Men*, by John Steinbeck." An agent presented with this information may easily locate the "second book to the right of *War and Peace*," and then may compare the title and author of the book to the descriptive information presented in order to verify that he or she has located the correct item.

In another example, illustrated by FIG. 7B, communication device 350 may present position information 600 in a shorthand notation representing the item's position. In this example, the shorthand notation "4L" indicates the position "fourth from the left". Other such shorthand notations may be used to describe any of the types of position information described herein, such as count values, direction, reference items/markers, etc. For example, "3T" may indicate that an item is "third from the top" or "2L-Y" may indicate that an item is the $2^{nd}$ item to the left of a Yellow marker item. Also presented in this example is descriptive information 610. In this case, descriptive information 610 includes pattern information representing the visual appearance of the book to be picked, "tall, brown book." If there is only one "tall, brown book" in the inventory area, an agent presented with both position information 600 and descriptive information 610 may be able to use either one to quickly locate or identify an item that is likely to be the item to be picked, and may use the other information to verify that the correct item has been located.

While FIGS. 7A and 7B illustrate several examples of position information 600 and descriptive information 610, other types of position and/or descriptive information may be used to locate and/or identify an item to be picked. For example, in some embodiments descriptive information 610 may include an indication of the size and scale of the item to be picked. In other embodiments, descriptive information 610 may include pattern information representing a pattern applied to the item or its packaging to facilitate an agent picking the correct item, rather than an intrinsic characteristic of the item.

In some embodiments, communication device 350 may be configured to allow a user, such as a picking agent, to request additional information to help identify an item to be picked. For example, in one embodiment, just position information 600 may be presented and the picking agent may request additional information through a button or other user interface control of communication device 350. In response, communication device 350 may present pattern information, or may present a scale indicator, according to one embodiment. In order to present additional information for an item, communication device 350 may request additional information from control system 400, or may load additional information from a local or remote product database 410, according to various embodiments. In one embodiment, communication device 350 may initially present no pattern or position information and may present this information only after the picking agent requests, and communication device 350 receives (or retrieves), the information. For example, the initial picking instructions may only include text representing a title or label on the item and if the agent is not able to quickly locate the correct item, he or she may request position information, pattern information, or both. In another embodiment, communication device 350 may be configured to present different amounts of information based on the length of time the picking instructions are presented. For example, if a picking agent is having difficulty locating a particular item, communication device 350 may be configured to present additional or supplemental information for that item. In yet other embodiments, communication device 350 may present only position information or only pattern information and may not present an item's title or description. Additionally, communication device 350 may be configured to present only an item's title and/or descriptive information initially, but may then present position information if a picking agent requests additional information or if the picker is taking a longer time than usual (or longer than a configurable time) to locate the item. In yet another embodiment, communication device 350 may be configured to present additional information if the picking agent scans (using a scan-code reader) an incorrect item. In some embodiments, the amount or fidelity of the presented information may vary based upon the availability of network resources, such as network bandwidth, control system 400, and/or product database 410.

In some embodiments, rather than using a computer-based communication device, printed pick lists including presented position information may also be used to locate items in inventory. In other embodiments, communication device 350 may include, or may be used in conjunction with a head mounted display for presenting position information. In one embodiment, position information may be presented on a head-up display, or other transparent or semi-transparent display device configured to present position information in front of a picking agent's eyes while still allowing a picking agent to see through the display. In yet another embodiment, position information may be presented auditorily, such that a picking agent can hear the position information. In general, various methods for presenting position information may be used in different embodiments, depending on the specific nature of each embodiment.

In order to take advantage of position-based item identification, a materials handling facility may in some embodiments operate using one or more sets of positional placement guidelines governing how items are stored in inventory areas. In various embodiments, different types of items may be stored according to different guidelines. For example, books may be stored on shelves according to a guideline specifying that books should always be added to the right of any other books already in the inventory area. In another example, books may always be added to the right of all other items already in the inventory area. In other examples, clothes on hangers may always be added to the right of other clothes, clothes stored on shelves may always be added to the top of a stack of clothes, or CDs and DVDs may always be added to the front of a group of similar items lined up front to back on a shelf or in a bin. In other embodiments, different guidelines may be applied to different inventory areas or to different types of inventory areas. For example, items stored on narrow shelves may always be added on the right, while items stored on deep shelves or in bins may always be added to the front. In another example, if items of different sizes and shapes are stored together in an inventory area, a placement guideline may specify that items should be placed in order of size, such as with the largest item adjacent to one side of the inventory area and successively smaller items placed next to each other toward the middle or the other side. In other embodiments, when items are added to inventory areas storing many different items that are easily distinguished from each other, the items may be added without regard to any positional placement guidelines.

Figure 8:
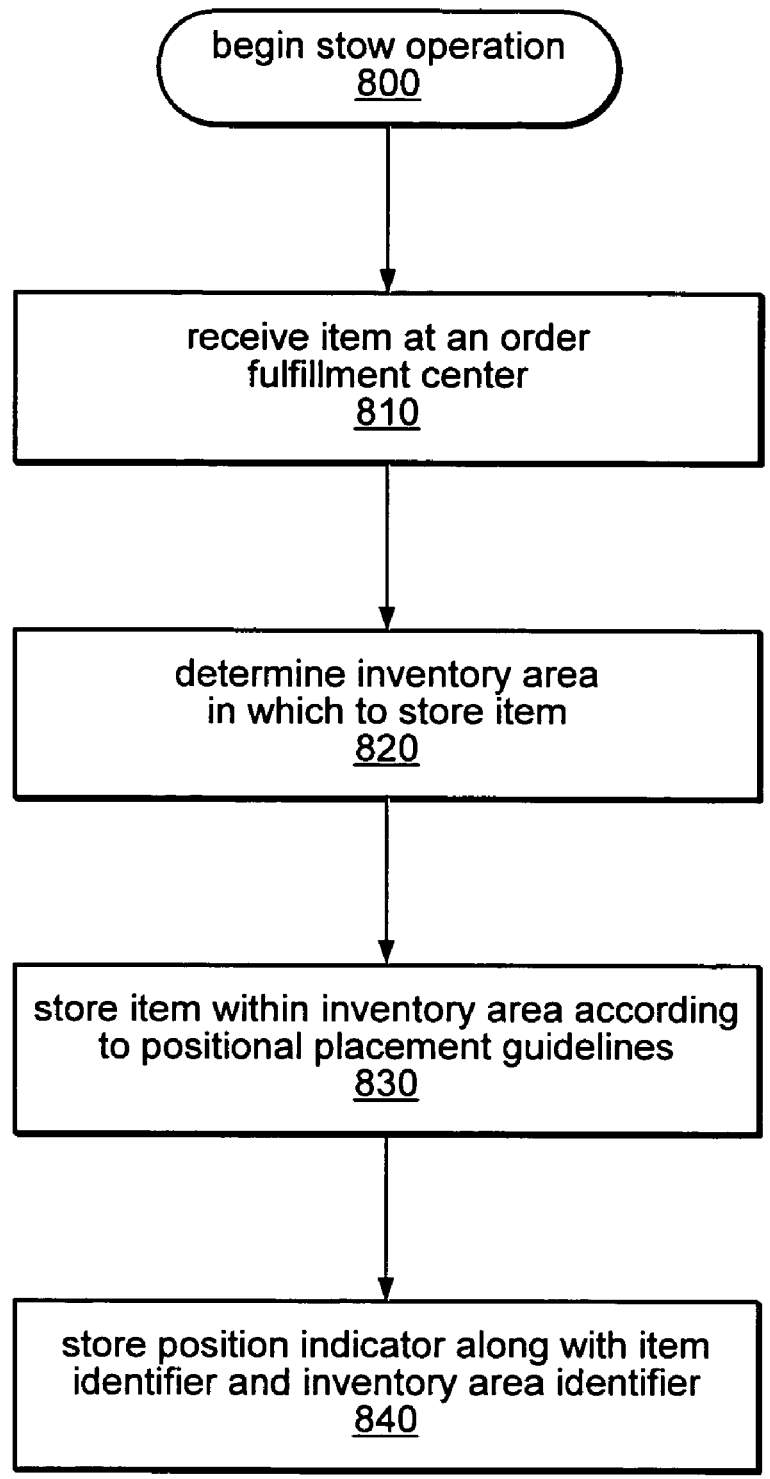
FIG. 8 is a flowchart illustrating one embodiment of a method for storing items according to positional placement guidelines.

One embodiment of a method for storing items in a materials handling facility employing position-based item identification is illustrated in FIG. 8. In this example, a stow operation begins at 800. The facility may first receive an item, such as through receiving stations 180, as illustrated by block 810. In some embodiments, multiple, different product items may be stored together in a single inventory area, such as a shelf, rack, bin, or drawer. Different methods may be used to determine one of a plurality of inventory areas in which to store the item, as described in 820. For example, items may be stored in particular inventory areas by an agent, either randomly or according to various guidelines, or an inventory area may be determined for each item automatically, such as by software executing on a control system, in some embodiments. In some embodiments, software, such as software running on control system 400, may automatically determine one or more inventory areas in which to store the item such that the item may be easily distinguishable from other co-located items. In other embodiments, determining an inventory area for an item may be done manually by inventory stocking agents. In such embodiments, inventory stocking agents may select an inventory area for an item according to various guidelines to avoid inventory areas already containing a similar item, such as a second DVD having a similar title or appearance. For example, inventory stocking agents may only place items with different pattern information in a single inventory area, in some embodiments. In other embodiments, inventory stocking agents may only place similar items (such as DVDs) in a single inventory area if they are identical items. As described above, an agent or control system 400 may record the selected inventory area for each stored item in a product database, such as product database 410, which may include a description, inventory area location number, or other data representing the inventory area 135 in which the item is stored in the facility, indexed by a product identification code, for example.

Once an inventory area 135 is selected, an inventory stocking agent may in some embodiments place the received item in the inventory area according to one or more positional placement guidelines, as described herein. This is illustrated as block 830 in FIG. 8. As noted above, items may be placed within an inventory area according to a single guideline (e.g., "always add items on the right,") or different guidelines may be applied according to various characteristics of the item and/or the inventory area in which it is stored. Additional examples of positional placement guidelines are described below.

One the received item is stored in one of the inventory areas 135, an indicator of the item's position within the area may be associated with the corresponding item's identifier, and may be stored along with an identifier of the item and/or an identifier of the inventory area, as in 840. In some embodiments, pattern information may also be stored long with position information at this time, while in other embodiments, pattern information associated with the item may be stored separately and/or at a different time. As previously noted, an identifier of the item may include an item's inventory identification number, Universal Product Code (UPC), Stock-Keeping Unit (SKU) code, model number, version number and/or other designation (including proprietary designations), according to various embodiments.

In some embodiments, the position indicator may include a time stamp of the stow operation, and this may be captured and associated with the item when it is stored. Storing the data and time of the stow operation for each item as it is added to an inventory area may provide enough information for the control system to determine the item's position in the area, in some embodiments. For example, if items are always added to the right of any items already in the inventory area, the control system may be configured to determine the order in which items are stored by sorting the time stamps associated with each of the items. In this example, the item that was placed in the inventory area first (earliest) will be on the far left, the item stored second will be immediately to its right, and so on, and the last item added will be farthest to the right. In this example, the item associated with the third oldest time stamp may be the third item from the left, and the item associated with fourth oldest time stamp may be the fourth item from the left, and so on. The use of time stamps may also allow the control system to determine an item's position relative to other items in the inventory area. For example the item associated with a time stamp value of 3:00 am on a given date may be two items to the left of an item associated with a time stamp value of 5:00 pm on the same day, if only one other item in the inventory area is associated with a time stamp value between these two time stamp values.

In some embodiments a time stamp may be captured automatically when an item is stored in an inventory area, such as if an item identifier and/or inventory identifier is scanned at the time of placement according to the standard stowing operation. In such embodiments, no extra steps may be necessary during stowing to facilitate position-based item identification for the picking operation. In other embodiments, an agent may enter a date and/or time using communication device 350 or another input/output device when he or she stores an item in an inventory area, or may explicitly trigger capturing and storing a time stamp, such as by pressing a button on communication device 350 to indicate that the item has been stored or by some other means. Entering or initiating capturing and storing of a time stamp may not be done immediately by the agent, but may be performed within a specified time limit after each item is stored, according to different embodiments. In yet other embodiments, one or more time stamps may be captured and stored that correspond to an agent starting and/or completing the stowing operation for a group of items, thus providing an approximate stowing time for each item (e.g., the start or completion time for storing the group of items) or a range of times during which each item was stored (e.g., a time between two successive start or completion times, or between a start time and a completion time for stowing a group of items.) Therefore, as shown in the examples above, a time stamp associated with an item may represent an approximate time that the item was stored, rather than the precise time when the item was stored.

A position indicator may in some embodiments include an item count value or item index, rather than, or in addition to, a time stamp. For example, a control system, such as control system 400, or a database, such as product database 410, may store a current item count for each inventory area 135, which is incremented when an item is placed in the inventory area for storage and decremented when an item is picked (removed) from the area. In this example, when an item is placed in the inventory area, the inventory area's current item count is incremented. In one example, if there were four items in the inventory area when a fifth is added to the area, the fifth item may have the count value "5" associated with it, indicating that it is the fifth item in the area. The inventory area's current item count may be automatically incremented when an agent provides an indication that the item has been stored (such as by scanning an identifier of the item and/or the inventory area), or the agent may explicitly trigger an increment of the inventory area count, such as by pressing a button or entering a count using communication device 350 or another input/output device, in different embodiments.

The incremented item count may be stored in a control system, such as control system 400, or a database, such as product database 410, and associated with an identifier of the item that was placed and/or an identifier of the inventory area, in some embodiments. In embodiments in which items are placed according to positional placement guidelines, this item count value may, thus, correspond to the item's position within the inventory area. For example, if items are always added on the right, an item associated with an item count value of 3 may be the third item from the left hand side of the inventory area. In embodiments using an item count value as a position indicator, when an item is picked from an inventory area, the inventory area's current item count may be decremented. In some such embodiments, the item count values for one or more other items in the area may be updated to reflect that the item was removed and their positions have changed. In the example above, if the third item from the left is removed, the item count value for each item that was to the right of the removed item (i.e., those having an item count value greater than 3) may be decremented to reflect that they are now one item closer to the left hand side of the inventory area. In this example, if five items are stored in the inventory area and the third one (i.e., the one associated with the count value "3") is removed, then the inventory area's counter value may be decremented to 4, the count value for the item that was fourth may be updated to a value of 3, and the count value for the item that was fifth may be updated to a value of 4.

While many examples described herein involve positional placement guidelines based on the chronological order in which items are stowed in a materials handling facility, the positional placement guidelines used in position-based item identification may in some embodiments include size-based placement guidelines. For example, when storing items of greatly different sizes or shapes in a single inventory area, a guideline may direct a stowing agent to place larger items toward the sides of the inventory area and smaller items toward the middle. In some such embodiments, a product database, such as product database 410, may include information about the size or shape of the items and may be able to determine the position of an item placed using these guidelines by sorting the items according to size. In other embodiments, the control system, such as control system 400, may direct the stowing agent (such as through communication device 350) to stow the item in a particular position in the inventory area based on its size or other criteria and may store an indicator of its position in product database 410.

Some materials handling facilities may employ more complex placement guidelines than those described above. For example, in embodiments in which items may be stored in multiple rows or stacks, guidelines may be used to specify the number of items to store in each row or stack. Guidelines may also specify whether to distribute items among multiple rows or stacks as they are stowed or to complete one stack or row before stowing items in another row or stack, for example. Other complex guidelines may take into account a combination of size, shape, pattern information, or other criteria in determining a position in which to place an item in an inventory area.

Some materials handling facilities may not employ position-based placement guidelines during the stowing operation, but still may be able to take advantage of position-based item identification during the picking operation. In some such embodiments, an agent may choose a position in which to place an item within an inventory area (either randomly or otherwise) and may record the position of the item, such as by using a button, keypad, or other input/output mechanism on a communication device or scanner to communicate the position to control system 400. In such embodiments, the position recorded may be a relative position with respect to a standard reference (such as the left side of the inventory area). For example, the position "3" may indicate that the item is now the third item from the left. In another embodiment, one or more inputs may indicate a position within a particular row, stack, etc. For example, an agent may enter a "2" and then a "3", to indicate that the item is in the second row, and is the third item. In another example, an agent may enter "L" and then "4" to indicate that the item is in the stack on the left (L) and is the fourth item in the stack. Direct input of an item's position may also be used to enter position information in cases where placement guidelines are complex or where they provide some guidance, but leave the final placement decision to an agent, in some embodiments.

Some inventory areas may be large enough to contain a large number of similar or different items. In some embodiments, having a large number of items in one inventory area may make it more difficult to locate a particular item using position-based item identification. For example, if 20 books are stored on one shelf, it may take an agent longer to locate the eighth item on the shelf than it would to locate the fourth item on a shelf containing only 10 items. In some embodiments, the use of marker items may facilitate locating an item within an inventory area containing a large number of items. A maker item may in some embodiments be a non-product item, such as a brightly-colored, plastic shelf divider or a differently-colored clothes hanger, that is placed between two other items to provide an a reference point from which to describe the position of other items in the inventory area. For example, if a brightly colored divider is placed on a shelf of books after every fifth book, a position-based item identification system may present position information indicating that a particular book in that area is "2 items to the left of the red marker," or "3 items to the right of the blue maker." In some embodiments, guidelines for placing marker items may specify a standard spacing between markers, while in other embodiments, agents may place markers wherever they feel they may be useful in an inventory area.

In embodiments in which non-product markers are used, position information (such as a time stamp and/or an item count value) may be captured and/or stored for the marker item in the same manner as position information for non-marker items or a different method may be used.

In some embodiments, rather than deliberately placing non-product markers in an inventory area, an item that is easily recognized or distinguishable from other items may be designated as a marker item in the system. For example, because the book *War and Peace* is so large, it may be designated as a marker item in an inventory area in which it is stored. In another example, if an item is the only item of its type stored among a group of other items types (such as a single coffee mug on a shelf of books, CDs, and DVDs), the item may be designated as a marker item for that area. In some embodiments, an agent may designate an item as a marker item at the time that it is stored, while in other embodiments, control system 400 may detect that an easily recognizable item (e.g., one that history data shows has been consistently picked quickly, or for which product database 410 has stored an indication that it is easily recognizable) has been stored in the area and may designate it as a marker item for the area. Designating an item as a marker item may include storing an indication of its status as a marker in product database 410 or in any another medium storing position information for items in the materials handling facility. Once a marker item has been placed or designated, control system 400 may use this information to generate picking instructions using the marker as one of the available references, in some embodiments.

In any of the embodiments described herein, and in others not described, the control system may be configured to update the position information for one or more other items in an inventory when an item is stowed in the inventory area and its position within the inventory area is determined. For example, if an item is placed between two items already in the area or in a reference position (i.e., one that might be considered "first") the position indicators for the other items may need to be modified to reflect that the newly placed item has assumed a position formerly occupied by another item and that one or more of the items previously in the area have been shifted in position to accommodate the newly placed item. In some embodiments, updating the position information for the other items is done automatically whenever the control system receives an indication that an item has been stowed, while in other embodiments an update may be explicitly triggered by an agent as a "refresh" operation, or may be automatically performed by the control system at regular intervals or at various times (such as once per second, in a busy facility, or at the close of a shift.)

Figure 9:
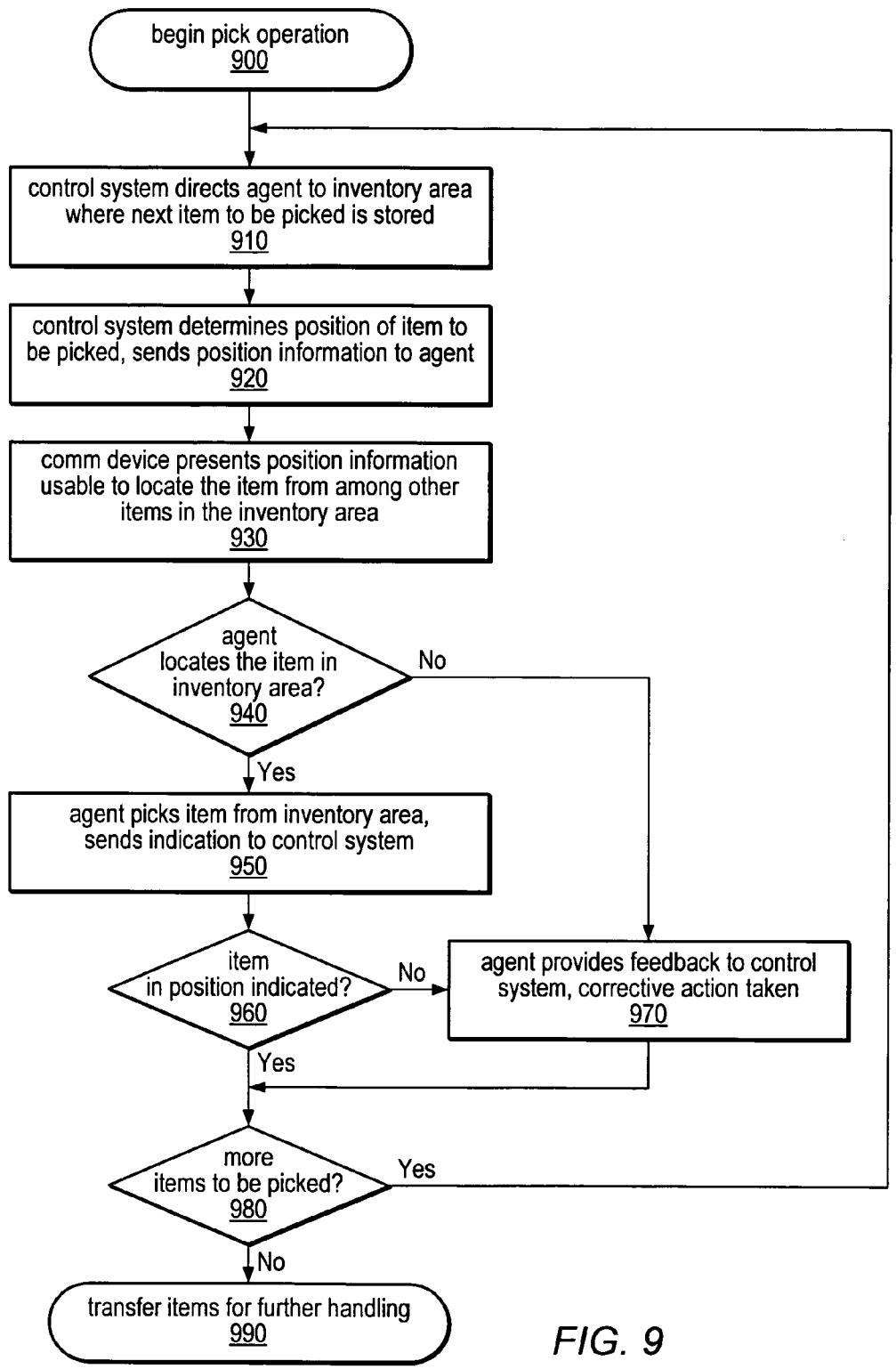
FIG. 9 is a flowchart illustrating one embodiment of a method for using position information to locate items in inventory.

One embodiment of a method for using position information for item identification is illustrated in FIG. 9. In some embodiments, a control system may direct an agent to an inventory area where an item to be picked is stored, as illustrated by block 910. For instance, control system 400, described above, may send picking instructions regarding an item to be picked to a communication device, such as communication device 350, directing a picking agent to retrieve the item from an inventory area, such as inventory area 135. The instructions may direct the picking agent to a particular inventory area and may include a description of the item to be obtained.

The control system, such as control system 400, may be configured to determine the position of the item to be picked, and to send the position information to the agent, as in 920.

The control system may access one or more stored position indicators associated with the item and may calculate the item's position based on the indicator(s), in some embodiments. For example, if a time stamp is used as a position indicator, the control system may calculate the item's position with respect to one side of the inventory area or with respect to a marker item in the inventory area by sorting the data associated with the items to determine the sequence of items according to their time stamps. Similarly, if an item count value is used as a position indicator, the control system may be configured to determine the item's position by sorting the data associated with the items and determining the sequence of items according to their item count values. In other embodiments, the count value itself represents the item's position with respect to a standard reference.

Note that in some embodiments, control system 400 may be configured to calculate an item's position with reference to more than one reference point. For example, in an inventory area containing twelve items, assume the item to be picked is the tenth from the left (e.g., if items are always added on the right and the item's time stamp or count value indicated that it is the tenth item in sequence). In this example, the control system may be configured to calculate the item's position with reference to the left hand side (tenth from the left), the right hand side (third from the right), or as a distance to the right or left of a marker item that is contained in the inventory area (e.g., if one of the twelve items is a deliberately placed marker or is an easily identifiable item and is designated as a marker.)

In some embodiments, if the calculated distance between the item to be picked and one of several references is greater than a given number, control system 400 may be configured to calculate the item's position relative to a different reference. This may allow an item's position to be described using a count value that is small enough for an agent to discern visually without actually counting over from a reference by that number of items. For example, agents may be able to easily locate the first, second, third, fourth, or fifth item from one side of the inventory area at a glance, but may not be able to identify the sixth or subsequent items without counting them. In some embodiments, one of the available references (such as the left hand boundary of the inventory area) may be the default reference, while others (such as the opposite boundary or a marker item) may serve as alternate references, according to various guidelines. In some embodiments, the number of items contained in one inventory area may be restricted, so that an agent may easily locate each item without having to count the items starting at the reference point. In other embodiments, marker items may be deliberately placed in an inventory area (such as after every five non-marker items) in order to facilitate quick visual location of items based on their position relative to one or more of the markers. The count values associated with each item may also allow the system to determine an item's position relative to other items in the inventory area. For example an item associated with a count value of 6 may be four items to the right of a marker item associated with a count value of 2, and the distance from the marker item (e.g., "4 to the right of the green marker") may be calculated by control system 400 as position information for the item.

Once the item's position has been determined, it may be sent to the agent to facilitate picking. To send the information to the agent, the control system, such as control system 400, may be configured to send position information to the agent's communication device, such as communication device 350. The position information may be encoded in various ways, as described herein.

Communication device 350 may receive the position information from control system 400 or may determine position information from cached information or information received from another source, as described above regarding FIGS. 5A through 5D. Communication device 350 may then present the position information usable to locate the item in the inventory area, as illustrated by block 930. As described above, communication device 350 may present the position information in a number of ways including, but not limited to, graphically, textually, or both, in some embodiments. In some embodiments, additional information, such as pattern information or other descriptive information, may be sent to communication device 350 from control system 400 and may be presented to a picking agent along with, or instead of, position information.

A picking agent may attempt to locate the item to be picked based on the presented position information. If the agent is not able to locate the item, as illustrated by the negative exit from block 940, the agent may first request a refresh of the position information, such as if position information is cached in communication device 350 or elsewhere. If the agent is still unable to locate the item using current position information, the agent may provide feedback to the control system indicating that the item was not found. In some embodiments, if the agent is not able to locate the item using the position information, the agent may request additional information, such as pattern information, to assist him or her in locating the item, and the item may be found and removed. In different embodiments, if the agent is not able to locate the item from the position information, the agent may be instructed to keep looking in the area (e.g., to request additional information or to read the titles or labels of all the items) before giving up, or may move on to another item to be picked. In either case, if the item is not found, another attempt to locate the item may be made at another time, such as during an investigation of the reported feedback.

One condition that may result in position information being incorrect for an item is the presence of multiple copies of an item in a single inventory, in some embodiments. For example, if two copies of a book are stowed on the same shelf, but not adjacent to each other, a picking agent may be presented with position information for one of the copies, but may select another copy for picking (e.g., if the agent identifies the book by its pattern information or title.) In this case, when the item is picked, and an indication is sent to control system 400 that the correct item has been located, control system 400 may update the position information for one or more of the remaining items incorrectly. For example, if the presented position information indicated that the third book from the left should be picked, but the agent located an identical book at the sixth position from the left, control system 400 may incorrectly update the position information for the items previously located in the fourth and fifth positions, assuming that they were now the third and forth books from the left. Thus, in some embodiments, placement guidelines may specify that multiple copies of an item may not be stowed in a single inventory area unless they are adjacent to each other. In this way, the position information of other items in the area may not be affected no matter which of the multiple copies the agent picks.

If the agent is able to locate the item, he or she may remove the item from the inventory area, or "pick" the item, as in 950. If the item was found in the position indicated by the presented position information, as illustrated by the positive exit from block 960, the picking operation for that item may be complete. In some embodiments, when an item is picked, an indication of success is sent to control system 400. Control system 400 may, in some embodiments, update position information for one or more of the remaining items in the inventory area based on the removal of the picked item. Control system 400 may capture and/or store the indication of a successfully picked item, along with other information, for further analysis. For example, control system 400 may be configured to calculate the number or percentage of items successfully picked using position information vs. pattern information, or may determine the optimal information to be presented when picking certain items or types of items based on the elapsed picking time and the amount and type of information provided. In another example, control system 400 may determine the optimal information to be presented to particular picking agents, based on historical data, or for picking items from particular inventory areas, such as those storing a single item type vs. different item types.

If there are other items to be picked, as illustrated by the positive exit from decision block 980, the method illustrated by FIG. 9 begins again with control system 400 directing the agent to another inventory area where the next item to be picked may be stored. If there are no other items to be picked at this time, as illustrated by the negative exit from 980, the picked items may be transferred for further handling (such as to a sorting or packaging station), as indicated at 990.

If the item was found in the inventory area, but not in the position indicated by the presented position information, the agent may provide feedback to the control system indicating that that an error was detected in the determined and/or stored position information for the item. This is illustrated by the negative exit from block 960 and by block 970. In some embodiments, an error indication may trigger a manual review of the contents of the inventory area, to be performed immediately or at a later time. For example, when an item is not found or is found in a position other than the one indicated by the presented position information, an agent may be instructed to count and enter (using communication device 350) the number of items in the inventory area. If the number of items in the inventory area matches the expected number of items (as indicated by control system 400 through communication device 350), the agent may be instructed to perform a spot check of some of the remaining items to verify their stored position information. If no other errors are detected, no other action may be taken at that time. If other errors are detected, the agent may indicate that a more thorough review of the error may be performed at a later time.

In other embodiments, an error indication may trigger control system 400 to automatically "reset" or "zero-out" the position information for one or more of the items in the inventory area, such as for all of the items before or after the misplaced item, according to positional placement guidelines. In yet other embodiments, when an error is detected, the picking agent may be instructed to scan all the items in the inventory, in an order according to any applicable positional placement guidelines (e.g., left to right where items are added on the right, or bottom to top where items are added to the top). This scanned information may be received by control system 400 and may be used to associate the correct position information to identifiers of the items in the area. In other embodiments, control system 400 may send position information corresponding to all of the items in the area to communication device 350 and an agent may be instructed to re-arrange the items in the area so that they match the stored position information. In still other embodiments, when an error is detected in position information, the position information for one or more of the remaining items in the area is automatically marked as suspect, to be corrected later by one or more manual or automated methods.

In some embodiments, data related to detected errors may be stored and later analyzed to detect patterns, such as to determine if a particular inventory area is too large to make efficient use of position-based item identification, if a particular stowing agent is consistently misplacing items (e.g., not following the applicable positional placement guidelines), or if a particular picking agent is having difficulty locating items using position-based item identification. In some embodiments, corrective action may be taken based on this analysis, such as providing additional training to agents, increasing the use of markers in large inventory areas, changing placement guidelines for stowing items or changing the amount and/or type of information presented for picking certain items or types of items or presented to particular picking agents.

In some embodiments, control system 400 may determine the number of items to be picked by the agent, and may also determine whether there are more items to be picked, as illustrated by decision block 980. In other embodiments, the agent may be able to decide whether to pick additional items or not. For example, the agent may decide whether or not to pick additional items based upon the total load of items the agent is currently carrying. For instance, if the agent has picked bulky or heavy items, the agent may be able to notify control system 400 through communication device 350 not to provide any further picking instructions while the agent transfers the already picked items to a sorting station, in one embodiment. If there are no more items to be picked by this agent, the items may be transferred to another location for additional handling, as illustrated by block 990. For instance, the agent may transfer the picked items to a sorting or packing station, as described above.

The use of position-based item identification in a materials handling facility need not be implemented facility-wide at the same time. For example, in some embodiments, position-based item identification may be rolled out over time. In one such example, items stored in the facility after a given "start date" may be stored in inventory areas according to one or more positional placement guidelines and position information may be associated with an identifier of these items. In this example, items placed in the area after the start date may be located based on position information, referenced from the point of the most-recently added items. In this example, items placed in the area before the start date may be identified by other means, such as by title or pattern information presented to a picking agent. In some embodiments, the first item placed in an area after the start date may be designated as a marker item or a marker item may be added to an inventory area before the first non-marker item is placed following the start date. In such embodiments, items placed before the start date may be located, in part, based on a general position relative to the marker item, such as "to the left of the red marker" if new items are always added on the right. Similarly, if an item count is kept current for the inventory area, an item placed before the start date may be located, in part, based on a general position relative to the total number of items in the area, such as "in the bottom one-third," in some embodiments.

As position-based item identification is rolled out in a facility, agents may enter the total number of items in each inventory area the first time an item is stowed in the area after the start date, in some embodiments. In another embodiment, a separate operation may be performed by an agent to initialize an inventory area for position-based item identification, such as by scanning all the items in the inventory area before stowing any new items in the area.

Many of the operations illustrated by the flowcharts in FIGS. 8 and 9 may be suitable for automation, according to various embodiments. The amount of automation may vary from embodiment to embodiment. For example, in one embodiment, the entire receiving and stowing process may be completely automated using various conveying and scanning means to move the item within the facility and associate position and/or pattern information with the item. In one such embodiment, software executing on control system 400 may be configured to automatically determine pattern information and associate the pattern information with the item based upon an automated identification of the item, such as through the automated scanning of a bar-code, and may store the pattern information in product database 410. The software may also be configured to automatically determine one or more inventory areas in which to store the item such that the item may be easily distinguishable, based on the determined pattern information, from other co-located items, and may store an identifier of the inventory area in product database 410. In some embodiments, the software may also be configured to determine the item's position within the inventory area, based on positional placement guidelines followed by automated stowing means or by automatically capturing the position of the item using automated scanning. The software may then associate a position indicator with the item.

Some materials handling facilities may employ automated picking means, in some embodiments. In such embodiments, software executing on control system 400 may direct an automated picking machine to a particular inventory area to retrieve an item and may direct the picking machine to a particular item within the area corresponding to stored position information. For example, an automated picking machine may be directed to go a particular shelf of books and to retrieve the third book to the right of the inventory area's left boundary. The automated picking machine may locate the book by first locating the boundary (e.g., by using a scanner to detect a wall or shelf divider, or a bar code on a wall or shelf divider) and then scanning from left to right, capturing and counting the number of books encountered until it reaches the third one, in one embodiment. In one embodiment, a scanner of an automated picking machine may scan an identifier of each book as it sweeps across the shelf, enabling the automated picking machine to verify that the correct item was located if the identifier of the third book matches that of the item to be picked. In another embodiment, the automated picking machine may detect the edges of each book to count the books and may or may not verify that the correct book was located by scanning an identifier of the third book encountered. If the book is not the item intended for picking, the automated picking machine may send an error message to control system 400, which may handle the error in a manner similar to those described herein for non-fully-automated materials handling facilities.

Figure 10:
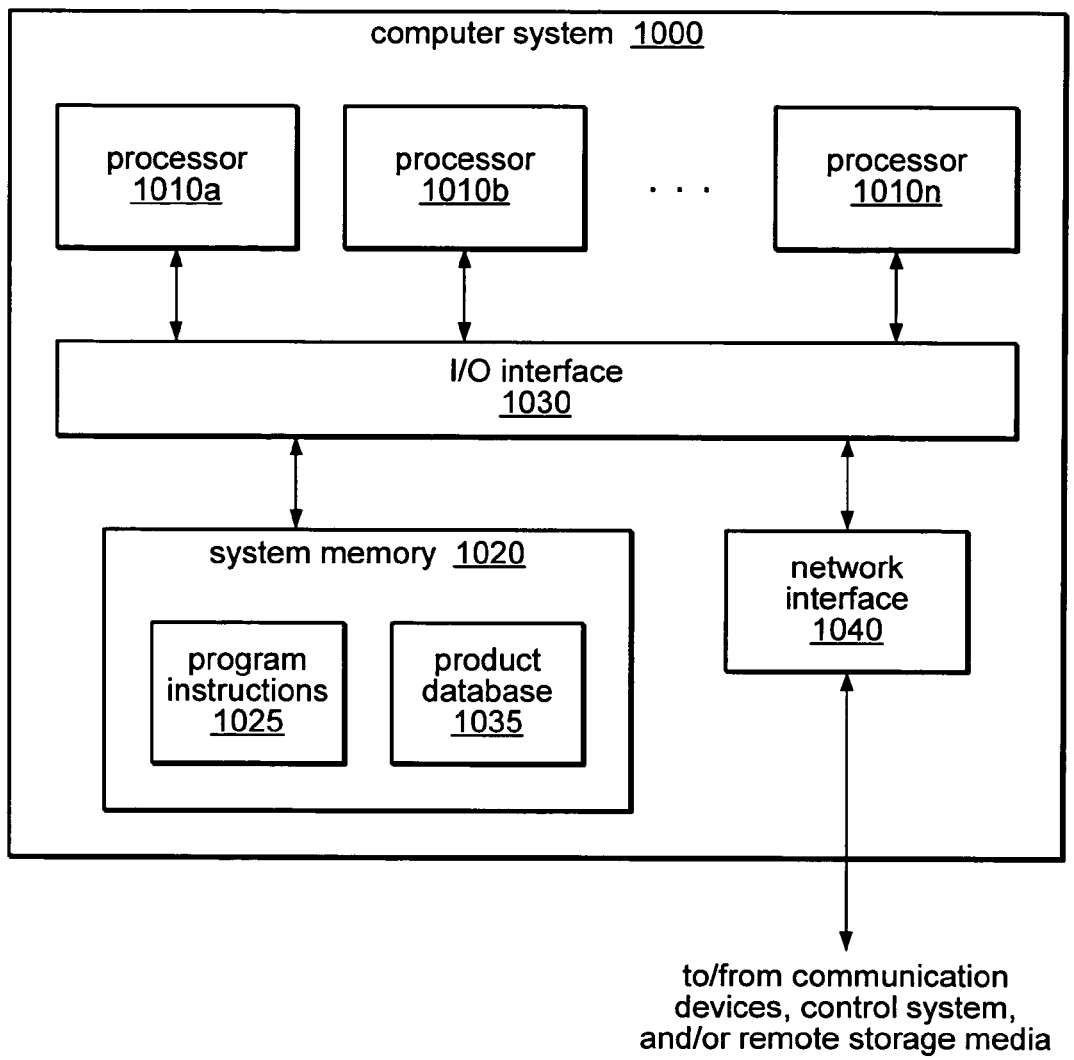
FIG. 10 is a block diagram illustrating an exemplary embodiment of a computer system suitable for implementing position-based item identification.

Any of various computer systems may be configured to implement position-based item identification, as described herein. For example, FIG. 10 is a block diagram illustrating one embodiment of a computer system usable to implement position-based item identification. In this example, an order fulfillment control system, such as control system 400, or a communication device, such as communication device 350, both illustrated in FIG. 4, may include a general-purpose computer system that includes or is configured to access one or more computer-accessible media, such as computer system 1000 illustrated in FIG. 10. In some embodiments, an order fulfillment facility or other materials handling facility may also include various communication devices, described above, each of which may include a general-purpose computer system, such as computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of control system 400, while in other embodiments control system 400 may include elements in addition to computer system 1000. In some embodiments, computer system 1000 may be illustrative of a communication device 350, while in other embodiments a communication device 350 may include elements in addition to computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for an order fulfillment control system (e.g., control system 400), or for a communication device (e.g., communication device 350), are shown stored within system memory 1020 as program instructions 1025. Program instructions 1025 may in some embodiments include a software implementation of one or more counters, such as the counters described herein for tracking the number of items in each inventory area and/or for determining a position indicator (comprising a respective item count value) for each of the items stored in each inventory area. In some embodiments, system memory 1020 may include product database 1035, which may be configured as described herein (e.g., product database 410.) In some embodiments, a portion of system memory 1020 may be configured as a cache for storing position and/or descriptive information for a plurality of items (e.g., position information cache 520).

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example. In particular, network interface 1040 may be configured to allow communication between computer system 1000 and the various communication devices 350, or control system 400, described above. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD-ROM coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In one embodiment, the relationship between control system 400 and communication devices 350 may be a server/client type of relationship. For example, control system 400 may be configured as a server computer system 1000 that may convey instructions to and receive acknowledgements from communication devices 350. In such an embodiment, communication devices 350 may be relatively simple or "thin" client devices. For example, communication devices 350 may be configured as dumb terminals with display, data entry and communications capabilities, but otherwise little computational functionality. However, in some embodiments, communication devices 350 may be computer systems configured similarly to computer system 1000, including one or more processors 1010 and various other devices (though in some embodiments, a computer system 1000 implementing a communication device 350 may have somewhat different devices, or different classes of devices, compared to a computer system 1000 implementing control system 400). It is further contemplated that in some embodiments, the functionality of control system 400 may be distributed across some or all of communication devices 350. That is, in some embodiments, there may be no centralized point of control of the activity of order fulfillment center agents 300; rather, communication devices 350 may function in a cooperative, distributed fashion to coordinate the activities of the order fulfillment facility.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   receiving a plurality of items at a materials handling facility, wherein the materials handling facility comprises one or more buildings in which items are stored in a plurality of inventory areas, and wherein items picked from the inventory areas are shipped from the one or more buildings to different destination locations to fulfill orders for the items;
   for each of the plurality of items:
      storing the item in a respective one of the plurality of inventory areas in the materials handling facility, wherein storing the item comprises placing the item at a particular position within the inventory area according to one or more positional placement guidelines that describe how items should be placed in the inventory area relative to other items in the same inventory area; and
      using a computer to perform storing a respective position indicator in association with an identifier of the item in a database;
   in response to receiving an order for one or more of the plurality of items, wherein the order identifies each of the one or more ordered items:
      accessing the database to determine the respective position indicator that is stored in association with an identifier of a given one of the one or more ordered items;
      determining position information describing the particular position at which the given one of the one or more ordered items is stored in terms of a relationship between the particular position at which the given item is stored and a position of at least one other item in the same inventory area as the given item, wherein said determining is dependent on the determined position indicator; and
      displaying, on a communication device, instructions visible to an agent inside the materials handling facility that are usable by the agent to locate the given one of the one or more ordered items to be picked from a given inventory area in the materials handling facility, wherein the given inventory area stores a plurality of dissimilar items, and wherein the displayed instructions comprise the position information.

2. The method of claim 1, wherein said one or more positional placement guidelines comprises a guideline specifying a direction in which items are added to an inventory area relative to any items already present in the inventory area.

3. The method of claim 1, wherein said using a computer to perform storing a respective position indicator comprises using the computer to perform storing in the database an indication of an association between the respective item identifier, the respective position indicator, and an identifier of the one of the plurality of inventory areas in which the item is stored, wherein the association stored in the database is usable to enable locating the item from among the plurality of inventory areas.

4. The method of claim 3, further comprising:
  using the computer to perform determining the particular position at which the given item is stored within the materials handling facility dependent on the stored indication of the association between the respective position indicator and the identifier of the one of the plurality of inventory areas in which the given item is stored;
  wherein said determining position information is dependent on the determined particular position.

5. The method of claim 1,
  wherein a respective inventory area item count value is associated with each of the plurality of inventory areas and represents a count of items in the inventory area;
  wherein, for each of the plurality of items, the method further comprises using the computer to perform incrementing the inventory area item count value associated with the respective one of the plurality of inventory areas when the item is placed in the inventory area; and
  wherein the respective position indicator stored in association with the given item comprises a respective item count value representing the incremented inventory area item count value.

6. The method of claim 5, further comprising using the computer to perform decrementing the respective inventory area item count value associated with a given one of the plurality of inventory areas when an item is removed from the given one of the plurality of inventory areas.

7. The method of claim 1, wherein the respective position indicator stored in association with the given item comprises a time stamp value, and wherein the time stamp value represents an approximate time at which the item was placed in the inventory area.

8. The method of claim 1, wherein the position information in the instructions to locate the given item is usable to distinguish the given item from other items present within the given inventory area.

9. The method of claim 8, wherein the instructions to locate the given item further comprise descriptive information stored in association with the identifier of the given item.

10. The method of claim 8, further comprising providing feedback to the computer indicating whether the position information represented a correct position of the given item within the given inventory area.

11. The method of claim 10, further comprising initiating a manual review of the position of one or more items within the given inventory area in response to the feedback indicating that the position information did not represent a correct position of the given item within the given inventory area.

12. The method of claim 10, further comprising modifying a respective position indicator stored in association with one or more items in the inventory area in response to the feedback indicating that the position information did not represent a correct position of the given item within the given inventory area.

13. The method of claim 12, wherein said modifying a respective position indicator comprises returning the respective position indicator to an initial or default value.

14. The method of claim 12, wherein said modifying a respective position indicator comprises marking the respective position indicator as suspect.

15. The method of claim 1, wherein said one or more positional placement guidelines comprises a guideline specifying that items are to be added to an inventory area in a direction consistent with an increasing or decreasing size ordering within the inventory area.

16. The method of claim 1, wherein said one or more positional placement guidelines comprises a guideline specifying a direction in which items are to be added to an inventory area relative to a particular boundary of the inventory area.

17. The method of claim 1, wherein said one or more positional placement guidelines comprises a guideline specifying a direction in which items are to be added to an inventory area relative to a marker item within the inventory area.

18. A method, comprising:
  in response to receiving an order for one or more of a plurality of items in a materials handling facility, wherein the order identifies each of the one or more ordered items, wherein the materials handling facility comprises one or more buildings in which items are stored in a plurality of inventory areas, and wherein items picked from the inventory areas are shipped from the one or more buildings to different destination locations to fulfill orders for the items:
    displaying, on a communication device, instructions visible to an agent inside the materials handling facility that are usable by the agent to locate a given one of the one or more ordered items within one of the plurality of inventory areas in the materials handling facility to be picked from the one of the plurality of inventory areas; wherein the instructions comprise position information for the given item; and
    the agent locating the given item in the materials handling facility dependent on the displayed position information and dependent on a position of at least one other item in the one of the plurality of inventory areas;
  wherein the one of the plurality of inventory areas stores a plurality of dissimilar items, and wherein the position information displayed in the instructions describes a position at which the given item is stored within the one of the plurality of inventory areas in terms of a relationship between the position at which the given item is stored and a position of at least one other item in the one of the plurality of inventory areas;
  wherein the position information for the given item is determined dependent on a respective product identifier for the given item and dependent on accessing a respective position indicator that is stored in association with the respective product identifier for the given item in a data store, and wherein the particular position at which the given item is stored within the one of the plurality of inventory areas is dependent on one or more positional placement guidelines that describe how items should be placed in the inventory area relative to other items in the same inventory area and that were used when stowing the given item in the one of the plurality of inventory areas.

19. The method of claim 18, wherein said one or more positional placement guidelines comprises a guideline specifying a direction in which items are to be added to an inventory area relative to any items already present in the inventory area.

20. The method of claim 18, wherein said one or more positional placement guidelines comprises a guideline specifying that items are to be added to an inventory area in a direction consistent with an increasing or decreasing size ordering within the inventory area.

21. The method of claim 18,
  wherein a respective inventory area item count value is associated with each of the plurality of inventory areas and represents a count of items in the inventory area;

wherein the method further comprises incrementing the inventory area item count value associated with the one of the plurality of inventory areas when the given item is placed in the one of the plurality of inventory areas;

wherein the respective position indicator stored in association with the respective product identifier for the given item comprises a respective item count value representing the incremented inventory area item count value; and wherein the method further comprises decrementing the inventory area item count value associated with a given one of the plurality of inventory areas is when an item is removed from the given one of the plurality of inventory areas.

22. The method of claim 18, wherein the respective position indicator stored in association with the respective product identifier for the given item comprises a time stamp value, and wherein the time stamp value represents an approximate time at which the given item was placed in the one of the plurality of inventory areas.

23. The method of claim 18, further comprising providing feedback indicating whether the received position information represented a correct position of the given item within the inventory area.

24. The method of claim 23, further comprising initiating a manual review of the position of one or more items within the one of the plurality of inventory areas in response to the feedback indicating that the received position information did not represent a correct position of the given item within the one of the plurality of inventory areas.

25. The method of claim 23, further comprising modifying a respective position indicator stored in association with the respective product identifier for one or more items in the one of the plurality of inventory areas in response to the feedback indicating that the received position information did not represent a correct position of the given item within the one of the plurality of inventory areas, wherein said modifying a respective position indictor comprises changing the value of the position indicator such that it comprises one or more of: an initial value, a default value, or a value indicating that the previous position indicator value is suspect.

26. A non-transitory, computer-readable storage medium, comprising program instructions computer-executable to implement:

in response to receiving an order for one or more of a plurality of items in a materials handling facility, wherein the order identifies each of the one or more ordered items, wherein the materials handling facility comprises one or more buildings in which items are stored in a plurality of inventory areas, and wherein items picked from the inventory areas are shipped from the one or more buildings to different destination locations to fulfill orders for the items:

receiving instructions for an agent inside the materials handling facility to locate a given one of the one or more ordered items to be picked from one of the plurality of inventory areas in the materials handling facility; wherein the instructions comprise position information for the given item; and displaying the position information in a manner visible to the agent to assist the agent in locating the given item in the materials handling facility, wherein said locating is further dependent on a position of at least one other item in the one of the plurality of inventory areas;

wherein the one of the plurality of inventory areas stores a plurality of dissimilar items; and wherein the displayed position information describes a particular position at which the given item is stored within the one of the plurality of inventory areas in terms of a relationship between the position at which the given item is stored and a position of at least one other item in the one of the plurality of inventory areas; and wherein the position information of the given item is determined dependent on a respective product identifier for the given item and dependent on accessing a respective position indicator stored in association with the respective product identifier for the given item in a data store, and wherein the particular position at which the given item is stored within the one of the plurality of inventory areas is dependent on one or more positional placement guidelines that describe how items should be placed in the inventory area relative to other items in the same inventory area and that were used when stowing the given item in the one of the plurality of inventory areas.

27. The storage medium of claim 26, wherein said one or more positional placement guidelines comprises a guideline specifying a direction in which items are to be added to an inventory area relative to any items already present in the inventory area.

28. The storage medium of claim 26, wherein a respective inventory area item count value is associated with each of the plurality of inventory areas and represents a count of items in the inventory area;

wherein the program instructions are further computer-executable to implement incrementing the inventory area item count value associated with the one of the plurality of inventory areas when the given item is placed in the one of the plurality of inventory areas;

wherein the respective position indicator stored in association with the respective product identifier for the given item comprises a respective item count value representing the incremented inventory area item count value; and wherein the program instructions are further computer-executable to implement decrementing the inventory area item count value associated with a given one of the plurality of inventory areas when an item is removed from the given one of the plurality of inventory areas.

29. The storage medium of claim 26, wherein the respective position indicator stored in association with the respective product identifier for the given item comprises a time stamp value, and wherein the time stamp value represents an approximate time at which the given item was placed in the one of the plurality of inventory areas.

30. The storage medium of claim 26, wherein the program instructions are further computer-executable to implement:

providing feedback indicating whether the received position information represented a correct position of the given item within the one of the plurality of inventory areas.

31. A non-transitory, computer-readable storage medium, comprising program instructions computer-executable to implement:

for each of a plurality of items in a materials handling facility, wherein the materials handling facility comprises one or more buildings in which items are stored in a plurality of inventory areas, and wherein items picked from the inventory areas are shipped from the one or more buildings to different destination locations to fulfill orders for the items:

receiving an indication that the item was stored in a respective one of the plurality of inventory areas in the materials handling facility, wherein the one of the plurality of inventory areas stores a plurality of dissimilar items, and wherein the item was stored at a particular position within the inventory area according to one or more positional placement guidelines that describe how items should be placed in the inventory area relative to other items in the same inventory area and dependent on a position of at least one other item in the one of the plurality of inventory areas; and storing a respective position indicator in association with an identifier of the item in a database; and in response to receiving an order for one or more of the plurality of items, wherein the order identifies each of the one or more ordered items:

accessing the database to determine the respective position indicator that is stored in association with an identifier of a given one of the one or more ordered items;

determining position information describing the particular position at which the given one of the one or more ordered items is stored in terms of a relationship between the position at which the given item is stored and a position of at least one other item in the same inventory area as the given item, and wherein said determining is dependent on the determined position indicator; and displaying instructions visible to an agent inside the materials handling facility that are usable by the agent to locate the given one of the one or more ordered items to be picked from a given inventory area in the materials handling facility, wherein the given inventory area stores a plurality of dissimilar items, and wherein the displayed instructions comprise the position information.

32. The storage medium of claim 31, wherein said one or more positional placement guidelines comprises a guideline specifying a direction in which items are to be added to an inventory area relative to any items already present in the inventory area.

33. The storage medium of claim 31, further comprising program instructions computer-executable to implement:

for each of the plurality of items:

storing in the database an indication of an association between the respective item identifier, the respective position indicator, and an identifier of the one of the plurality of inventory areas in which the item is stored;

wherein the association stored in the database is usable to enable locating the item from among the plurality of inventory areas.

34. The storage medium of claim 31, wherein the program instructions are further computer-executable to implement determining the position of the given item within the inventory area in which it is stored dependent on the stored indication of the association between the respective position indicator and the identifier of the one of the plurality of inventory areas in which the item is stored.

35. The storage medium of claim 31, wherein the respective position indicator stored in association with the identifier of the item comprises an item count value representing a count of items in the one of the plurality of inventory areas immediately after the given item was placed in the one of the plurality of inventory areas.

36. The storage medium of claim 31, wherein the respective position indicator stored in association with the identifier of the item comprises a time stamp value, and wherein the time stamp value represents an approximate time at which the item was placed in the one of the plurality of inventory areas.

37. A system, comprising:

a database configured to store a respective position indicator for each of a plurality of items in a materials handling facility in association with a respective product identifier for each of the items, wherein the materials handling facility comprises one or more buildings in which items are stored in a plurality of inventory areas, wherein the position at which each of the plurality of items is stored within one of the plurality of inventory areas is dependent on one or more positional placement guidelines used in storing the item within the one of the plurality of inventory areas, and wherein items picked from the inventory areas are shipped from the one or more buildings to different destination locations to fulfill orders for the items; and a control system communicatively coupled to the database, wherein in response to receiving an order for one or more of the plurality of items the control system is configured to:

access the database to determine the respective position indicator that is stored in association with a product identifier of a given one of the one or more ordered items;

determine position information for the given one of the one or more ordered items within a given one of the plurality of inventory areas dependent on the determined position indicator and dependent on a position of at least one other item in the given inventory area; wherein the given inventory area stores a plurality of dissimilar items; and wherein the position information describes a particular position at which the given item is stored within the given inventory area in terms of a relationship between the position at which the given item is stored and a position of the at least one other item in the given inventory area; and communicate the position information to an agent in the materials handling facility to assist the agent in locating the given item within the given inventory area.

38. The system of claim 37, wherein the respective position indicator comprises a time stamp value, wherein the time stamp value represents an approximate time at which the given item was placed in the one of the plurality of inventory areas, and wherein to determine the position information for the given item, the control system is configured to sort the respective time stamp values of two or more of the items in the one of the plurality of inventory areas to determine an order of the relative positions of the two or more items within the one of the plurality of inventory areas.

39. The system of claim 37, wherein the respective position indicator comprises an item count value representing a count of items in the one of the plurality of inventory areas immediately after the given item was placed in the inventory area, and wherein to determine the position information for the given item, the control system is configured to sort the respective item count values of two or more of the items in the one of the plurality of inventory areas to determine an order of the relative positions of the two or more items within the one of the plurality of inventory areas.

40. The system of claim 37, wherein to determine the position information for the given item, the control system is configured to calculate a distance from the given item to a boundary of the one of the plurality of inventory areas in terms of a number of items from the boundary to the given item, including the given item.

41. The system of claim 37, wherein to determine the position information for the given item, the control system is configured to calculate a distance from the given item to a marker item within the one of the plurality of inventory areas in terms of a number of items from the marker item to the given item, including the given item.

42. The system of claim 37, wherein to determine the position of the given item, the control system is configured to calculate a distance of the given item, in terms of a number of items, relative to a top or bottom of a stack of items within the one of the plurality of inventory areas.

43. The system of claim 37, wherein to determine the position information for the given item, the control system is configured to calculate a distance from the given item to one end of a row of items within the one of the plurality of inventory areas in terms of a number of items from the end of the row of items to the given item, including the given item.

44. The system of claim 37, wherein the one or more positional placement guidelines comprises a guideline specifying a direction in which items are to be added to an inventory area relative to any items already present in the inventory area.

45. The system of claim 37, wherein the control system is further configured to store in the database for each of the plurality of items an indication of an association between the respective product identifier, the respective position information, and the one of the plurality of inventory areas in which the item is stored, wherein the association stored in the database for each of the plurality of items is usable to enable locating the item from among the plurality of inventory areas.

46. The system of claim 37,
wherein to communicate the position information the control system is configured to send, to each of a plurality of communication devices, picking instructions for an agent to locate one or more of the one or more items to be picked from one or more of the plurality of inventory areas.

47. The system of claim 46, further comprising the plurality of communication devices, wherein each of the communication devices is configured to:
receive, from the control system, the picking instructions;
determine, from the picking instructions, position information for each of the one or more items to be picked; and
display the position information for each of the one or more items to be picked to assist the agent in locating the item at a particular position within a respective one of the plurality of inventory areas based on the displayed position information.

48. The system of claim 47, wherein each of the communication devices is further configured to:
determine, from the picking instructions, descriptive information for each of the one or more items to be picked; and
display the descriptive information for each of the one or more items to be picked to assist the agent in locating the items based on the displayed position information and the displayed descriptive information.

49. The system of claim 47, wherein each of the communication devices is further configured to:
cache descriptive information for a plurality of items in the inventory area;
access descriptive information for each of the one or more items to be picked from the cache; and
display the descriptive information for each of the one or more items to be picked to assist the agent in locating the items based on the displayed position information and the displayed descriptive information.

50. The system of claim 47, wherein the communication devices are further configured to send an indication to the control system if one or more of the items to be picked is not located in a position within a respective one of the plurality of inventory areas indicated by the displayed position information for the one or more items.

51. The system of claim 50, wherein the control system is further configured to modify a respective position indicator stored in association with an item not located in a position indicated by the displayed position information in response to receiving, from one of the communication devices, an indication that one or more of the items to be picked is not located in a position indicated by the displayed position information for the one or more items.

52. The system of claim 51, wherein said modifying a respective position indictor comprises changing the value of the position indicator such that it comprises one or more of: an initial value, a default value, or a value indicating that the previous position indicator value is suspect.

* * * * *